(12) United States Patent
Kujawski et al.

(10) Patent No.: US 9,908,041 B2
(45) Date of Patent: Mar. 6, 2018

(54) GAME CONTROLLER WITH REMOVABLE FACETED FINGERPAD

(71) Applicant: Microsoft Technology Licensing, LLC, Redmond, WA (US)

(72) Inventors: Christopher H. Kujawski, Seattle, WA (US); Carl Ledbetter, Mercer Island, WA (US); Kenneth Jasinski, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 115 days.

(21) Appl. No.: 14/730,459

(22) Filed: Jun. 4, 2015

(65) Prior Publication Data

US 2016/0354685 A1    Dec. 8, 2016

(51) Int. Cl.
*A63F 9/24* (2006.01)
*A63F 13/24* (2014.01)
*A63F 13/98* (2014.01)
*A63F 13/00* (2014.01)

(52) U.S. Cl.
CPC .............. *A63F 13/24* (2014.09); *A63F 13/00* (2013.01); *A63F 13/98* (2014.09); *A63F 2300/1043* (2013.01)

(58) Field of Classification Search
None
See application file for complete search history.

(56) References Cited

U.S. PATENT DOCUMENTS

| | | | |
|---|---|---|---|
| 6,409,600 B1 | 6/2002 | Sobota et al. | |
| 7,973,762 B2 | 7/2011 | Naimo | |
| 2004/0188933 A1* | 9/2004 | Siciliano | A63F 13/02 273/148 B |
| 2005/0255915 A1* | 11/2005 | Riggs | A63F 13/06 463/37 |
| 2006/0136246 A1 | 6/2006 | Tu | |
| 2008/0188306 A1 | 8/2008 | Tetterington et al. | |
| 2009/0054146 A1* | 2/2009 | Epstein | A63F 13/06 463/38 |
| 2011/0105231 A1* | 5/2011 | Ambinder | A63F 13/24 463/38 |
| 2011/0306423 A1 | 12/2011 | Calderon | |
| 2012/0050232 A1* | 3/2012 | Ikeda | G06F 3/0338 345/184 |

(Continued)

FOREIGN PATENT DOCUMENTS

EP        2510988 A2    10/2012

OTHER PUBLICATIONS

"Sega Saturn Controller (2nd Edition)", Published on: Sep. 2, 2014 Available at: http://www.theverge.com/products/saturn-controller-2nd-edition/4256.

(Continued)

*Primary Examiner* — Jason Yen
(74) *Attorney, Agent, or Firm* — Alleman Hall Creasman & Tuttle LLP

(57) ABSTRACT

A finger pad for a game controller includes a first side and a second side opposite the first side. The first side includes a finger interface. The finger interfaces includes a plurality of planar facets. The planar facets are sized and shaped for manual manipulation by a finger. The second side includes a mounting interface.

20 Claims, 13 Drawing Sheets

(56) References Cited

U.S. PATENT DOCUMENTS

2013/0053146 A1 2/2013 Ikeda et al.
2014/0035888 A1* 2/2014 Levasseur ............ G06F 3/0334
345/184

OTHER PUBLICATIONS

Duff, Jeremy, "Evil D-Pad Impressions", Published on: Dec. 29, 2010 Available at: http://www.gamingnexus.com/Article/Evil-D-Pad-Impressions/Item2849.aspx.
"Sega Saturn Controller", Published Date: Dec. 3, 2011 Available at: http://www.theverge.com/products/saturn-controller/4255.
"The PSP had the best D-Pad", Published on: Feb. 8, 2013 Available at: http://www.escapistmagazine.com/forums/read/9.400440-The-PSP-had-the-best-D-Pad.
"Ringbow", Retrieved on: Mar. 2, 2015 Available at: http://ringbow.com/#ringbow.
"A New Era has Arrived—The Scuf 4ps is Here", Published on: Jan. 30, 2015 Available at: http://scufgaming.com/controllers/scuf-4ps-ps4/features/.
"Xbox 360 Controller Razer Onza Tournament Edition by Razer USA", Published on: Nov. 28, 2011 Available at: http://www.gamestop.com/xbox-360/accessories/xbox-360-controller-razer-onza-tournament-edition/97812.
ISA European Patent Office, International Search Report and Written Opinion Issued in Application No. PCT/US2016/031951, dated Aug. 17, 2016, WIPO, 11 Pages.
IPEA European Patent Office, Second Written Opinion Issued in PCT Application No. PCT/US2016/031951, dated Apr. 10, 2017, WIPO, 6 Pages.
"International Preliminary Report on Patentability Issued in PCT Application No. PCT/US2016/031951", dated Aug. 1, 2017, 7 Pages.

* cited by examiner

GAME CONTROLLER WITH REMOVABLE FACETED FINGERPAD

BACKGROUND

A user input control device, such as a game controller, may be used to provide user input to control an object or a character in a video game or to provide some other form of control. A game controller may include various types of controls that may be configured to be manipulated by a finger to provide different types of user input. Non-limiting examples of such controls may include push buttons, triggers, touch pads, joysticks, paddles, bumpers, and directional pads. The various controls may be manipulated to provide control signals that may be mapped to different operations in a video game.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A finger pad for a game controller includes a finger interface including a plurality of planar facets sized and shaped for manual manipulation by a finger.

DETAILED DESCRIPTION

User input control devices, such as game controllers, may be shaped/sized to fit an average hand size of a population of users. Likewise, finger-manipulatable controls (e.g., push buttons, triggers, joysticks, directional pads) that are integral to a game controller have traditionally been designed according to a "one size fits all" approach. However, different users may have different preferences on the shape, size, color, texture, or other attributes of such controls.

The present disclosure is directed to a customizable game controller that includes one or more finger manipulatable controls that can be swapped out in a tool-free manner. For example, such a configuration may facilitate the use of differently configured removable controller accessories that are customized for particular types of video games to be quickly swapped on the game controller when switching between playing different video games. In another example, such a configuration may facilitate the use of differently configured removable controller accessories that are preferred by different players to be quickly swapped on the game controller when the game controller is used by the different players.

Figure 1:
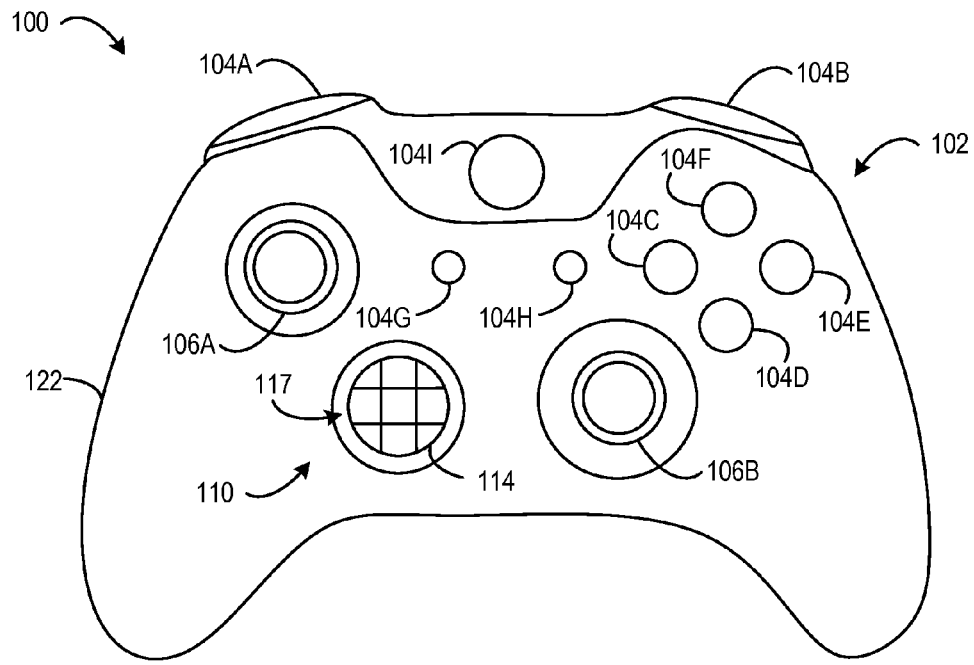
FIG. 1 shows a front of an example game controller.
Figure 2:
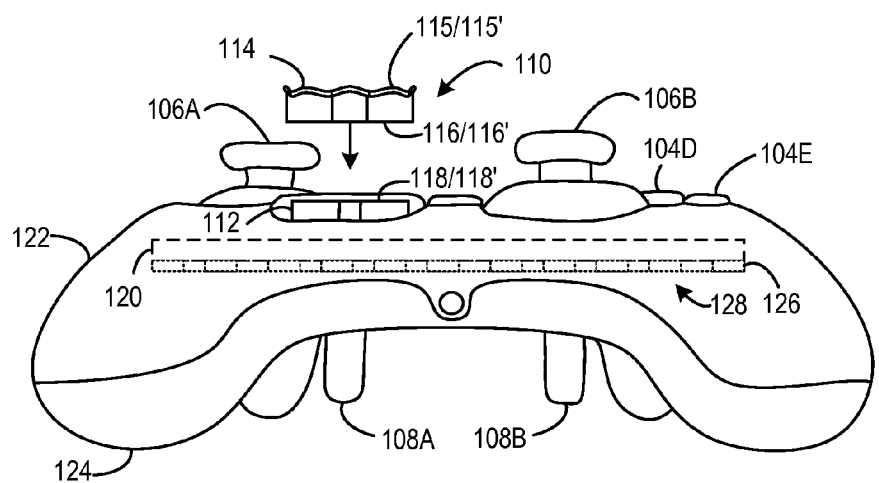
FIG. 2 shows a bottom view of the game controller of FIG. 1 with a removable controller accessory aligned to be removably affixed to a mounting platform.

FIGS. 1 and 2 show an example user input control device in the form of a game controller 100. The game controller 100 may be configured to translate user input into control signals that are provided to a computing device, such as a gaming console. The control signals may be mapped to commands to control a video game or perform other operations. For example, the game controller 100 may be configured to send control signals via a wired or wireless connection with a computing device.

The game controller 100 includes a plurality of controls 102 configured to generate different control signals responsive to finger manipulation. One or more of the plurality of controls 102 may include a removable finger pad 114. The removable finger pad 114 may be one of a plurality of differently configured removable controller accessories removably affixable to the game controller 100. For example, various differently configured removable controller accessories may have different sizes, shapes, and/or textured surfaces that are preferred by different users or may be suited for particular gaming or other purposes.

In the depicted implementation, the plurality of controls 102 includes a plurality of action buttons 104 (e.g., 104A, 104B, 104C, 104D, 104E, 104F, 104G, 104H, and 104I), a plurality of joysticks 106 (e.g., a left joystick 106A and a right joystick 106B), a plurality of triggers 108 (e.g., a left trigger 108A and a right trigger 108B), and a directional pad 110. The plurality of controls 102 may be coupled to a frame 120 (shown in more detail in FIG. 17). The frame 120 may be contained collectively within an upper housing portion 122 and a lower housing portion 124 of the game controller 100. In other words, the upper housing portion 122 and the lower housing portion 124 may cooperate to form a housing that contains at least a portion of each of the plurality of controls 102 that are coupled to the frame 120.

A printed circuit board 126 may be coupled to the frame 120. The printed circuit board 126 may include a plurality of electronic input sensors 128. Each electronic input sensor may be configured to generate an activate control signal responsive to interaction with a corresponding control. Non-limiting examples of electronic input sensors may include dome switches, tactile switches, Hall Effect sensors, potentiometers, and other electronic sensing components. Any suitable sensor may be implemented in the game controller 100. In some implementations, two or more printed circuit boards may be used.

The game controller 100 may include any number of controls, any type of controls, any number of electronic input sensors, and any type of electronic input sensors without departing from the scope of this disclosure.

Each of the action buttons 104 may be configured to activate a corresponding electronic input sensor 128 to generate an activate control signal responsive to being depressed (e.g., via finger manipulation). For example, each control signal associated with an action button may be mapped to a video game operation. Different video games may have different mappings of control signals to operations. In some cases, each action button may be mapped to a different operation. In other cases, two action buttons may be mapped to a same operation.

Each of the joysticks 106 may be configured to provide two-dimensional input that is based on a position of the joystick in relation to a default "center" position. For example, the joysticks may interact with electronic input sensors in the form of potentiometers that use continuous electrical activity to provide an analog input control signal.

Each of the triggers 108 may be configured to provide a variable control signal based on a position of the trigger relative to a default position. For example, as a trigger is pulled farther away from the default position a characteristic of the generated control signal may increase in magnitude.

In the depicted implementation, the directional pad 110 is the only control on the game controller 100 that is configured to interface with a plurality of differently configured removable controller accessories such that a selected removable controller accessory may be removably affixed to the game controller 100. In particular, the directional pad 110 includes a mounting platform 112 configured to interface with a selected removable controller accessory in the form of a removable finger pad 114. The mounting platform 112 may include a topside 118 including an accessory-retention interface 118' configured to interface with a mounting interface 116' of the removable finger pad 114.

As such, the directional pad 110 includes the mounting platform 112 and the removable finger pad 114 when the removable finger pad 114 is removably affixed to the mounting platform 112.

In the illustrated example, the removable finger pad 114 includes a topside 115 that includes a finger interface 115'. The finger interface 115' includes a plurality of planar facets 117 sized and shaped for manual manipulation by a finger. In particular, each planar facet may include a plurality of edges that define a flat surface of that planar facet. The plurality of planar facets 117 may be arranged to facilitate movement of the finger pad 114 in specific directions corresponding to the different planar facets. For example, the plurality of planar facets 117 include a center planar facet having four edges and four cardinal facets each aligned with a different edge of the center planar facet. The four cardinal planar facets may facilitate movement of the finger pad 114 in the four cardinal directions (e.g., up, down, left, right). Further, the plurality of planar facets 117 include four diagonal planar facets that are each positioned between a different pair of cardinal planar facets. Each diagonal planar facet may extend outward from a corner of the center planar facet. The four diagonal planar facets may facilitate movement of the finger pad 114 in four diagonal directions (e.g., up-right, down-right, down-left, up-left).

The center planar facet may be oriented to have a level surface that does not slope in any direction. Further, each of the four cardinal planar facets and each of the four diagonal planar facets may ramp upward from the center planar facet to a perimeter edge of the finger interface 115'. Such a configuration may form a faceted bowl. Moreover, the angle of each of the plurality of planar facets 117 may allow a user to easily recognize each different direction in which the finger pad 114 may be depressed. Furthermore, since each of the plurality of planar facets 117 has a different orientation, a user may easily recognize a boundary between different facets without any additional textural indicators (e.g., ridges, bumps, depressions, or other barriers). Correspondingly, the relatively smooth surface collectively created by the plurality of planar facets 117 may allow for fluid thumb movements between the different planar facets without interference from any textural indicators. Accordingly, a user may quickly transition between pressing different directions on the finger pad 114.

Note that the planar faceted configuration is merely one non-limiting example, and the finger interface 115' may include any suitable surface, feature, shape, and/or structure configured to be touched and/or manually manipulated by a finger to provide user input. Further note that, in some implementations, the finger pad 114 including the plurality of planar facets 117 may be integral to the directional pad 110 such that the finger pad 114 is not removable. In other words, the directional pad 110 may include the plurality of planar facets 117.

The removable finger pad 114 may include an underside 116 that is opposite the topside 115. The underside 116 may include the mounting interface 116' The mounting interface 116' may include any suitable surface, feature, shape, and/or structure configured to selectively mate with the mounting platform 112 to removably affix the removable finger pad 114 to the game controller 100. For example, the mounting interface 116' of the removable finger pad 114 may have a shape that complements a shape of an accessory-retention interface 118' of the mounting platform 112. Such corresponding interfaces may aid the removable finger pad 114 in aligning with the mounting platform 112 to removably affix the removable finger pad 114 to the game controller 100.

Furthermore, the mounting platform 112 may include one or more accessory-retention features (examples of which are shown at least at FIGS. 13-14 and 14-19) configured to removably affix various removable controller accessories to the game controller 100 without the use of any tools. Such accessory-retention features may allow for differently configured removable controller accessories to be quickly and easily interchanged without the use of tools.

The directional pad 110 may be configured to reside in a default posture when no touch force is applied to the directional pad 110. In the default posture, the directional pad 110 does not cause any of the plurality of electronic input sensors 128 to generate an activate control signal indicative of touch input. Further, the directional pad 110 may be configured to move from the default posture to a selected activation posture responsive to a touch force being applied to the directional pad 110. The selected activation posture may be one of a plurality of different activation postures that each generate a different activate control signal or combination of activate control signals by interfacing with different electronic input sensors.

Note that the activation signal indicative of touch input produced in the selected activation posture may be any signal that differs from a signal or lack thereof produced in the default posture. For example, in some implementations, the activation signal may correspond to a supply voltage (e.g., VDD) of the game controller 100 and the signal produced in the default state may correspond to a relative ground. (e.g., 0). In other implementations, the activation signal may correspond to a relative ground and the signal produced in the default state may correspond to the supply voltage of the game controller 100.

In the depicted implementation, the directional pad 110 is depressible in four different directions (e.g., up, down, left, and right) to interface with different electronic input sensors that generate different activate control signals. In some implementations, the four different directions may correspond to four different activation postures that generate four different activate control signals to provide four-way directional input. In some implementations, combinations of activate control signals corresponding to pressing the directional pad 110 in two directions (e.g., up and left) at one time may be interpreted as additional activation postures corresponding to diagonals in between the four directions to provide eight-way directional input. In some implementations, the directional pad 110 may include a number of directions different than four or eight. For example, the directional pad 110 may include two or more different directions.

Note that the mounting platform 112 may be further configured such that when a removable controller accessory is not affixed to the mounting platform 112, a touch force may be applied directly to the mounting platform 112. The mounting platform 112 may be configured to translate the touch force into movement of the mounting platform 112 that applies an activation force to one or more electronic input sensors to generate one or more different control signals. In other words, the mounting platform 112 may function as a directional pad itself when a removable controller accessory is not affixed to the mounting platform 112. In one example, an activation force may include an amount of force sufficient to actuate a dome switch. The activation force may be any suitable amount of force to activate an electronic input sensor.

Although the mounting platform 112 may translate a touch force to an activation force, the mounting platform 112 may otherwise differ from a traditional directional pad. For example, the mounting platform 112 may be recessed from a surface of the upper housing portion 122 of the game controller 100 in order to accommodate a thickness of the removable finger pad 114. As such, the removable finger pad 114 will not excessively protrude from the mounting platform 112 and interfere with operation of other controls (e.g., joystick 106A) of the game controller 100. Further, the topside 118 of the mounting platform 112 may have abrupt edges that are configured to mate with the finger pad 114. In contrast, traditional directional pads may have edges and surfaces that are contoured to comfortably accommodate a user's thumb.

In the depicted implementation, the directional pad 110 is the only control of the plurality of controls 102 on the game controller 100 that is configured to removably affix differently configured removable controller accessories to the game controller 100. In other implementations, the game controller 100 may include more than one control that is configured to removably affix differently configured removable controller accessories to the game controller 100. Further, in some implementations, the game controller 100 may include different types of controls other than the directional pad 110 that are configured to removably affix differently configured removable controller accessories to the game controller. For example, one or more of the joysticks, action buttons, or triggers may be configured to removably affix differently configured removable controller accessories to the game controller 100.

In some implementations where two different controls are configured to removably affix removable controller accessories to the game controller 100, each such control may be configured to interact with a different group of removable controller accessories. In particular, the different removable controller accessories in a given group may have a same mounting interface that is configured to be removably affixed to a particular control. In other words, a selected removable controller accessory may only be compatible with one of the two controls. In other implementations, where two different controls are configured to removably affix removable controller accessories to the game controller 100, both controls may be configured in the same manner such that a selected removable controller accessory may be compatible to be removably affixable to both controls.

Figure 3:
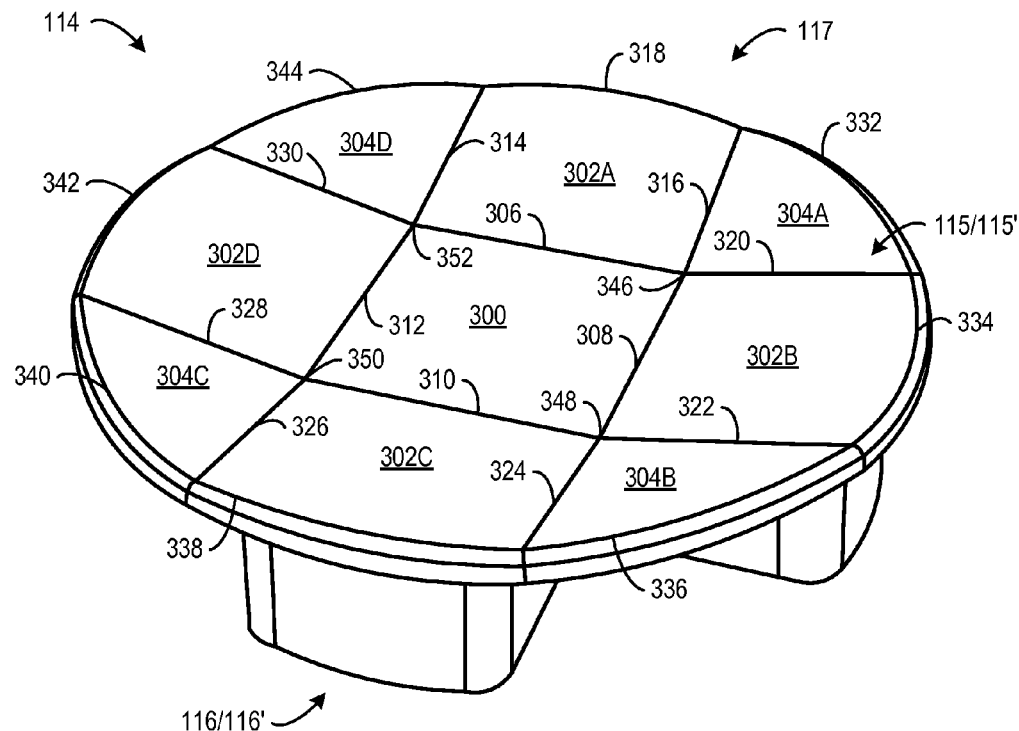
FIGS. 3-5 show the removable controller accessory of FIGS. 1-2.
Figure 4:
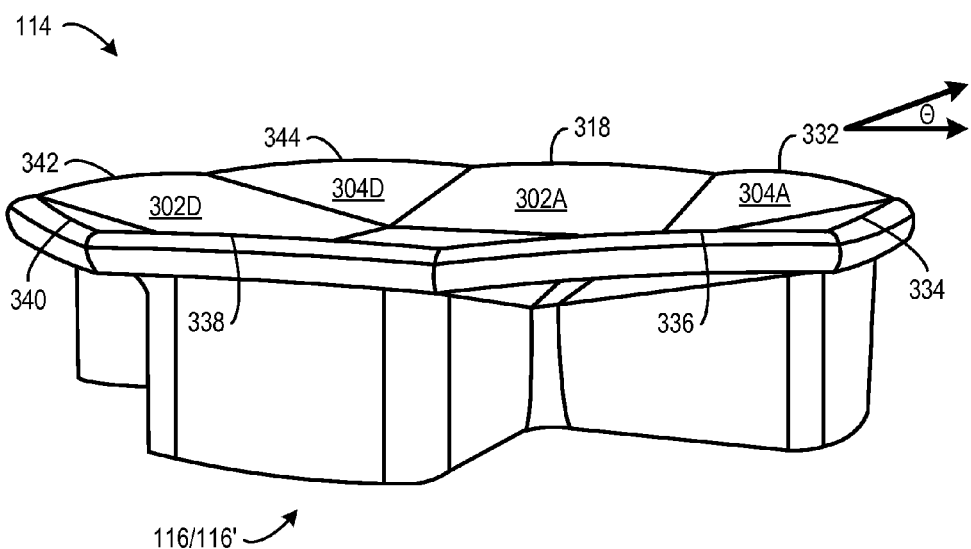
Figure 5:
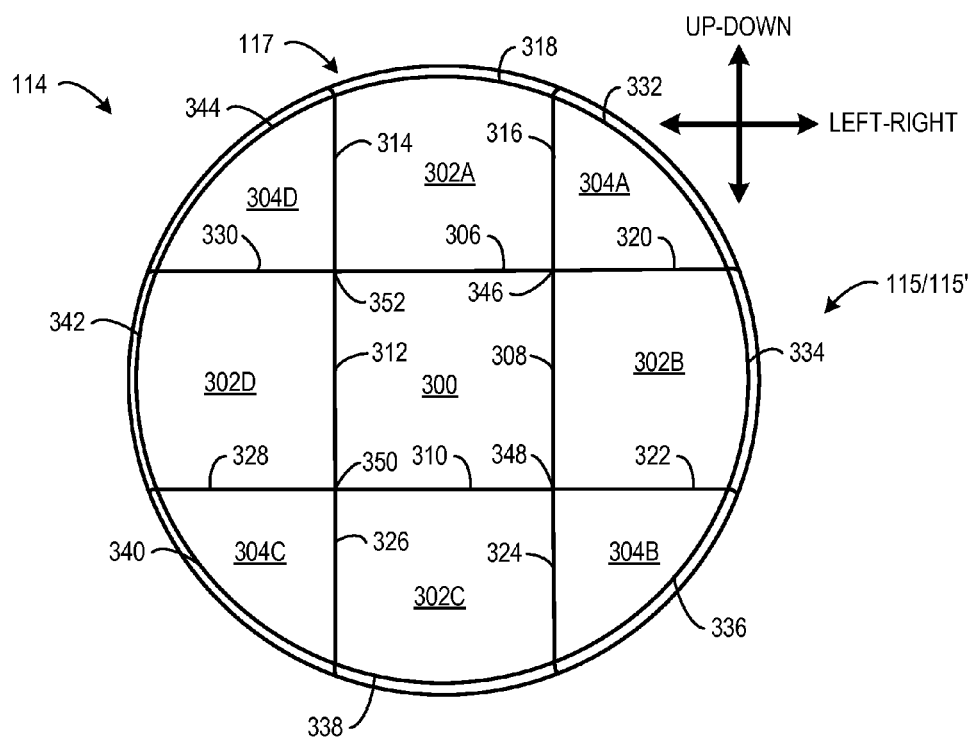

FIGS. 3-5 show the finger pad 114 having a finger interface 115' including a plurality of planar facets 117 that collectively form a faceted bowl shape. In particular, the finger interface 115' includes a center planar facet 300 having an up edge 306, a right edge 308, a down edge 310, and a left edge 312 that collectively define a surface of the center planar facet 300. The up edge 306 and the down edge 310 may be parallel to a left-right axis (shown in FIG. 5). The right edge 308 and the left edge 312 may be parallel to an up-down axis (shown in FIG. 5). The up edge 306 and the right edge 308 meet at an up-right corner 346. The right edge 308 and the down edge 310 meet at a down-right corner 348. The down edge 310 and the left edge 312 meet at a down-left corner 350. The left edge 312 and the up edge 306 meet at an up-left corner 352. Each corner forms a right angle.

A plurality of cardinal planar facets 302 neighbor the center planar facet 300 in the four cardinal directions (e.g., up, down, left, right). In particular, the plurality of cardinal planar facets 302 include a cardinal-up planar facet 302A, a cardinal-right planar facet 302B, a cardinal-down planar facet 302C, and a cardinal-left planar facet 302D. The cardinal-up planar facet 302A is bordered by the up edge 306, an up-left ramp edge 314, an up-right ramp edge 316, and an up-perimeter edge 318. The up-left ramp edge 314 and the up-right ramp edge 316 are parallel to the up-down axis. The cardinal-up planar facet 302A is said to neighbor the center planar facet 300, because the cardinal-up planar facet 302A shares the up edge 306 with the center planar facet 300.

The cardinal-right planar facet 302B is bordered by the right edge 308, a right-up ramp edge 320, a right-down ramp edge 322, and a right-perimeter edge 334. The right-up ramp edge 320 and the right-down ramp edge 322 are parallel to the left-right axis. The cardinal-right planar facet 302B is said to neighbor the center planar facet 300, because the cardinal-right planar facet 302B shares the right edge 308 with the center planar facet 300.

The cardinal-down planar facet 302C is bordered by the down edge 310, a down-right ramp edge 324, a down-left ramp edge 326, and a down-perimeter edge 338. The down-right ramp edge 324 and the down-left ramp edge 326 are parallel to the up-down axis. The cardinal-down planar facet 302C is said to neighbor the center planar facet 300, because the cardinal-down planar facet 302C shares the down edge 310 with the center planar facet 300.

The cardinal-left planar facet 302D is bordered by the left edge 312, a left-down ramp edge 328, a left-up ramp edge 330, and a left-perimeter edge 342. The left-down ramp edge 328 and the left-up ramp edge 330 are parallel to the left-right axis. The cardinal-left planar facet 302D is said to neighbor the center planar facet 300, because the cardinal-left planar facet 302D shares the left edge 312 with the center planar facet 300.

Furthermore, a plurality of diagonal planar facets 304 neighbor the center planar facet 300. In particular, each diagonal planar facet 304 is positioned between a different pair of cardinal planar facets of the plurality of cardinal planar facets 302. A diagonal up-right planar facet 304A is bordered by the up-right ramp edge 316, the right-up ramp edge 320, and an up-right perimeter edge 332. The diagonal up-right planar facet 304A shares the up-right ramp edge 316 with the cardinal-up planar facet 302A. The diagonal up-right planar facet 304A shares the right-up ramp edge 320 with the cardinal-right planar facet 302B. The diagonal up-right planar facet 304A is said to neighbor the center planar facet 300, because the diagonal up-right planar facet 304A and the center planar facet 300 meet at the up-right corner 346.

A diagonal down-right planar facet 304B is bordered by the right-down ramp edge 322, the down-right ramp edge 324, and a down-right perimeter edge 336. The diagonal down-right planar facet 304B shares the right-down ramp edge 322 with the cardinal-right planar facet 302B. The diagonal down-right planar facet 304B shares the down-right ramp edge 324 with the cardinal-down planar facet 302C. The diagonal down-right planar facet 304B is said to neighbor the center planar facet 300, because the diagonal down-right planar facet 304B and the center planar facet 300 meet at the down-right corner 348.

A diagonal down-left planar facet 304C is bordered by the down-left ramp edge 326, the left-down ramp edge 328, and a down-left perimeter edge 340. The diagonal down-left planar facet 304C shares the down-left ramp edge 326 with the cardinal-down planar facet 302C. The diagonal down-left planar facet 304C shares the left-down ramp edge 328 with the cardinal-left planar facet 302D. The diagonal down-left planar facet 304C is said to neighbor the center planar facet 300, because the diagonal up-right planar facet 304A and the center planar facet 300 meet at the down-left corner 350.

A diagonal up-left planar facet 304D is bordered by the left-up ramp edge 330, the up-left ramp edge 314, and an up-left perimeter edge 344. The diagonal up-left planar facet 304D shares the left-up ramp edge 330 with the cardinal-left planar facet 302D. The diagonal up-left planar facet 304D shares the up-left ramp edge 314 with the cardinal-up planar facet 302A. The diagonal up-left planar facet 304A is said to neighbor the center planar facet 300, because the diagonal up-left planar facet 304D and the center planar facet 300 meet at the up-left corner 352.

In the illustrated implementation, the center planar facet 300 has a flat and level orientation. Further, each ramp edge (e.g., 314, 316, 320, 322, 324, 326, 328, 330) extends at a ramp angle $\Theta$ (shown in FIG. 4) from the center planar facet 300 to a corresponding perimeter edge (e.g., 318, 332, 334, 336, 338, 340, 342, 344). As such, the up-perimeter edge 318 is higher than the up edge 306, the right-perimeter edge 334 is higher than the right edge 308, the down-perimeter edge 338 is higher than the down edge 310, and the left-perimeter edge 342 is higher than the left edge 312. Likewise, the up-right perimeter edge 332 is higher than the up-right corner 346, the down-right perimeter edge 336 is higher than the down-right corner 348, the down-left perimeter edge 340 is higher than the down-right corner 350, and the up-left perimeter edge 344 is higher than the up-left corner 352. In other words, each of the plurality of cardinal planar facets 302 and each of the plurality of diagonal planar facets 304 ramp upward from the center planar facet 300.

Further, each perimeter edge (e.g., 318, 332, 334, 336, 338, 340, 342, 344) is rounded such that each diagonal planar facet 304 has a sector shape and each cardinal planar facet 302 has a rectangular shape with a rounded outer edge. Such a configuration creates a faceted bowl or concave shape with the center planar facet 300 being positioned at a nadir of the bowl. Such a configuration may bias a position of a thumb placed on the finger interface 115' toward the center of the finger interface 115', while also allowing the thumb to easily detect and move to any of the plurality of planar facets 117 corresponding to the different directions on the finger pad 114.

The finger pad 114 may provide eight-way directional user input control. Although other finger pads may include any number of planar facets having any suitable size and/or shape without departing from the scope of the present disclosure. In some implementations, the cardinal planar facets all may be the same size. In other implementations, different cardinal facets may have different sizes and/or shapes. In one example, the cardinal planar facets may extend further outward than the diagonal planar facets, such that the finger interface 115' may have a shape of a cross overlaid on and extending from a circle or diamond. In another example, the diagonal planar facets may extend further outward than the cardinal planar facets. Further, in some implementations, the diagonal planar facets may have differently shaped outer edges than the cardinal planar facets, and vice versa. For example, the cardinal planar facets may have outer edge that are straight, and the diagonal planar facets may have outer edges that are rounded.

Furthermore, each ramp edge may be oriented at any suitable ramp angle without departing from the scope of the present disclosure. For example, the ramp angle $\Theta$ may be 10°, 15°, 30°, 45° or another angle. By virtue of the geometry, the cardinal planar facets ramp at the same angle as the ramp angles of adjacent ramp edges, while the diagonal planar facets will ramp at a lesser angle (as measured along a line that bisects the diagonal planar facet). Moreover, different swappable finger pads may be configured with different ramp angles such that the faceted bowl shape may be deeper or shallower to suit preferences of different users. In some implementations, different cardinal and/or diagonal planar facets may have different ramp angles.

Further still, the finger pad 114 may be any suitable height. Moreover, different swappable finger pads may be configured with different heights to suit preferences of different users.

Figure 6:
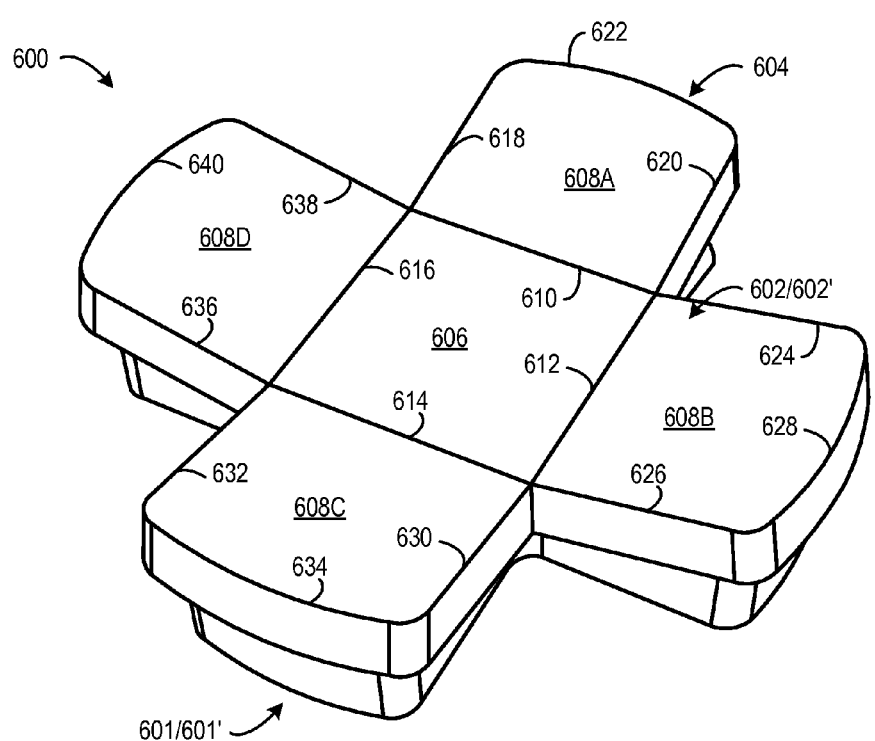
FIGS. 6-8 show another example removable controller accessory.
Figure 7:
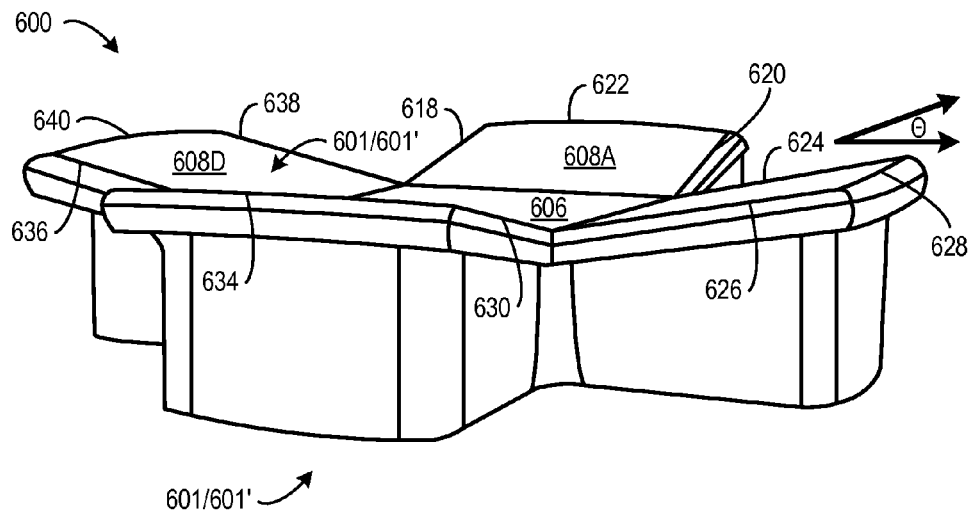
Figure 8:
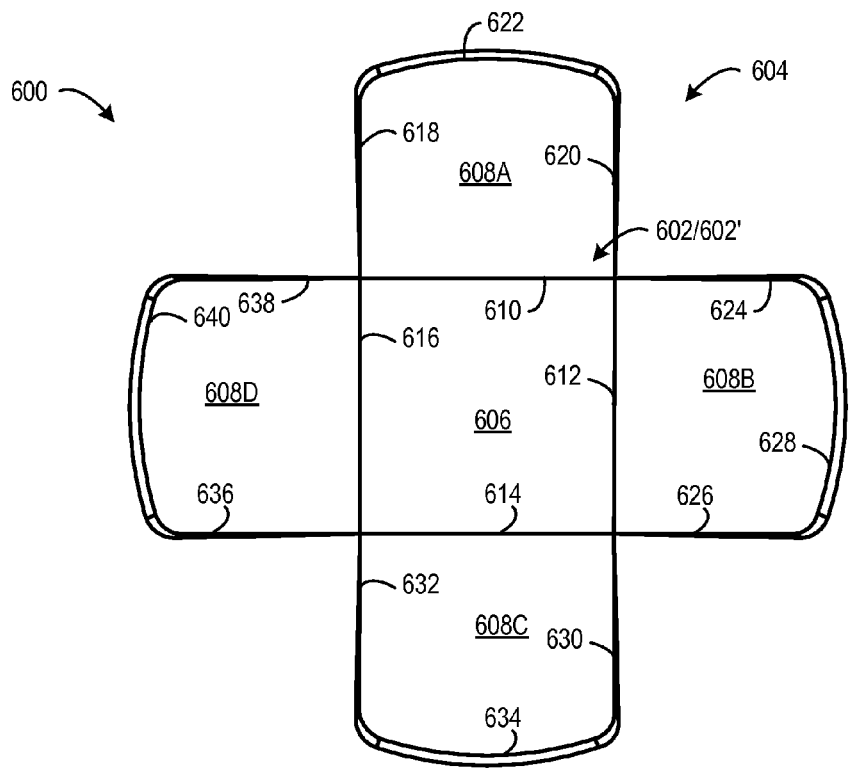

FIGS. 6-8 show another example finger pad 600 having topside 602 and an underside 601 opposite the topside 602. The underside 601 includes a mounting interface 601'. The topside 602 includes a finger interface 602' including a plurality of planar facets 604 that collectively form a cross shape. The finger pad 600 is configured to provide four-way directional input, because the finger pad 600 does not include any diagonal planar facets. In particular, the finger interface 602' includes a center planar facet 606 having an up edge 610, a right edge 612, a down edge 614, and a left edge 616 that collectively define a surface of the center planar facet 606. The up edge 610 and the down edge 614 may be parallel to a left-right axis (shown in FIG. 8). The right edge 612 and the left edge 616 may be parallel to an up-down axis (shown in FIG. 8).

A plurality of cardinal planar facets 608 neighbor the center planar facet 606 in the four cardinal directions (e.g., up, down, left, right). In particular, the plurality of cardinal planar facets 608 include a cardinal-up planar facet 608A, a cardinal-right planar facet 608B, a cardinal-down planar facet 608C, and a cardinal-left planar facet 608D. The cardinal-up planar facet 608A is bordered by the up edge 610, an up-left ramp edge 618, an up-right ramp edge 620, and an up-perimeter edge 622. The up-left ramp edge 618 and the up-right ramp edge 620 are parallel to the up-down axis. The cardinal-up planar facet 608A is said to neighbor the center planar facet 606, because the cardinal-up planar facet 608A shares the up edge 610 with the center planar facet 606.

The cardinal-right planar facet 608B is bordered by the right edge 612, a right-up ramp edge 624, a right-down ramp edge 626, and a right-perimeter edge 628. The right-up ramp edge 624 and the right-down ramp edge 626 are parallel to the left-right axis. The cardinal-right planar facet 608B is said to neighbor the center planar facet 606, because the cardinal-right planar facet 608B shares the right edge 612 with the center planar facet 606.

The cardinal-down planar facet 608C is bordered by the down edge 614, a down-right ramp edge 630, a down-left ramp edge 632, and a down-perimeter edge 634. The down-right ramp edge 630 and the down-left ramp edge 632 are parallel to the up-down axis. The cardinal-down planar facet 608C is said to neighbor the center planar facet 606, because the cardinal-down planar facet 608C shares the down edge 614 with the center planar facet 606.

The cardinal-left planar facet 608D is bordered by the left edge 616, a left-down ramp edge 636, a left-up ramp edge 638, and a left-perimeter edge 640. The left-down ramp edge 636 and the left-up ramp edge 638 are parallel to the left-right axis. The cardinal-left planar facet 608D is said to neighbor the center planar facet 606, because the cardinal-left planar facet 608D shares the left edge 616 with the center planar facet 606.

In the illustrated implementation, the center planar facet 606 has a flat and level orientation. Further, each ramp edge (e.g., 618, 620, 624, 626, 630, 632, 636, 640) extends at a ramp angle $\Theta$ (shown in FIG. 7) from the center planar facet 606 to a corresponding perimeter edge (e.g., 622, 628, 634, 640). As such, the up-perimeter edge 622 is higher than the up edge 610, the right-perimeter edge 628 is higher than the right edge 612, the down-perimeter edge 634 is higher than the down edge 614, and the left-perimeter edge 640 is higher than the left edge 616. In other words, each of the plurality of cardinal planar facets 604 ramp upward from the center planar facet 606. Further, in this implementation, the ramp edges (e.g., 618, 620, 624, 626, 630, 632, 636, 640) are also perimeter edges, because the finger pad 600 does not include any diagonal planar facets. Rather, a gap is formed diagonally between each cardinal planar facet and a neighboring cardinal planar facet of the plurality of cardinal planar facets 604.

Such a configuration creates a faceted concave shape with the center planar facet 606 being positioned at a nadir of the faceted concave shape. Such a configuration may bias a position of a thumb placed on the finger interface 602' toward the center of the finger interface 602', while also allowing the thumb to easily detect and move to any of the plurality of planar facets 604 corresponding to the different directions on the finger pad 600.

Figure 9:
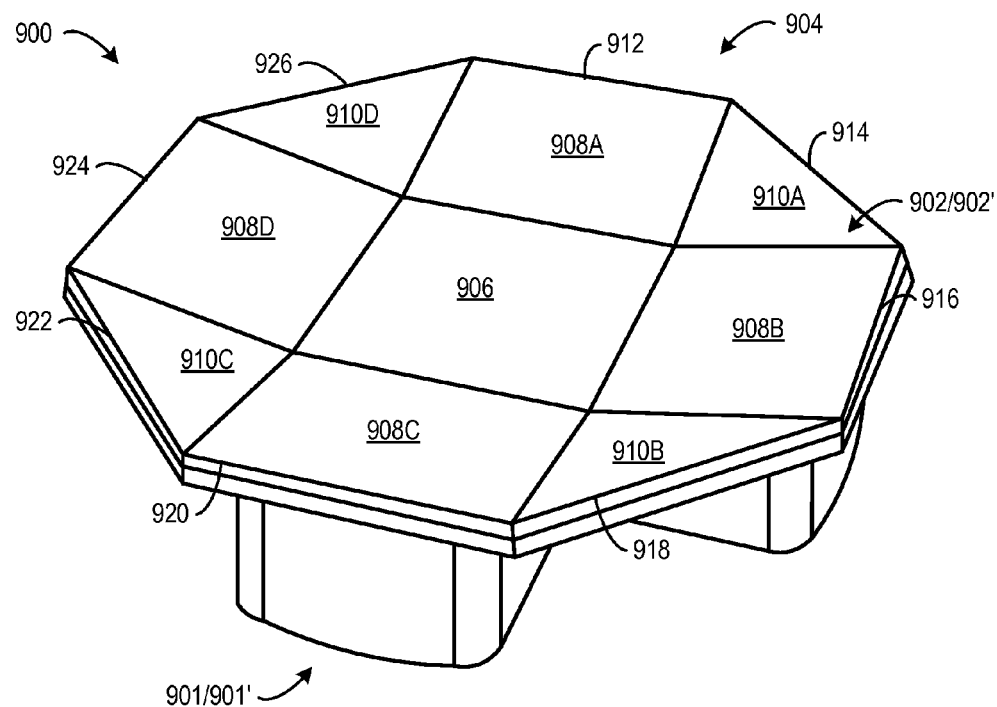
FIGS. 9-10 show another example removable controller accessory.
Figure 10:
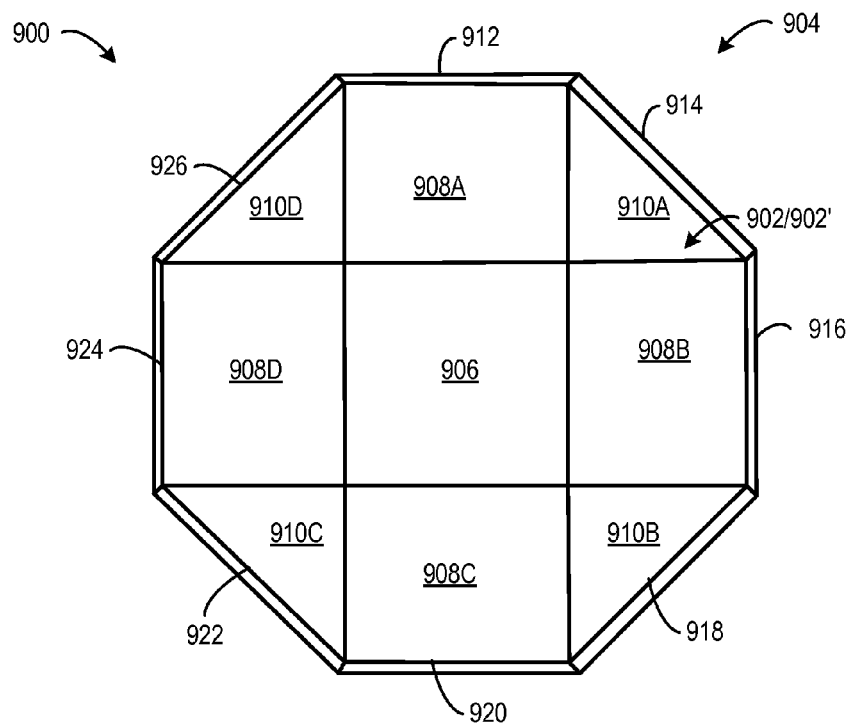

FIGS. 9-10 show another example finger pad 900 having topside 902 and an underside 901 opposite the topside 902. The underside 901 includes a mounting interface 901'. The topside 902 includes a finger interface 902' including a plurality of planar facets 904 that collectively form a concave octagonal shape. The finger pad 900 is configured to provide eight-way directional input in the same manner as the finger pad 114 shown in FIGS. 3-5. The finger pad 900 includes a center planar facet 906, a plurality of cardinal planar facets 910 (e.g., 908A, 908B, 908C, 908D), and a plurality of diagonal planar facets 910 (e.g., 910A, 910B, 910C, 910D). The plurality of planar facets 904 interconnect in the same manner as the plurality of facets 117 of the finger pad 114 shown in FIGS. 3-5, and for purposes of brevity such interconnections will be discussed no further.

In the illustrated implementation, each of the plurality of planar facets include a perimeter edge that is straight. In particular, an up-perimeter edge 912, an up-right-perimeter edge 914, a right-perimeter right edge 916, a down-right-perimeter edge 918, a down-perimeter edge 920, a down-left-perimeter edge 922, a left-perimeter edge 924, and an up-left-perimeter edge 926 are all straight. These straight edges collective form an octagonal shaped perimeter of the finger interface 902. Further, the straight perimeter edges of the cardinal planar facets 908 may cause the cardinal planar facets to be rectangular. Further, the straight perimeter edges of the diagonal planar facets 910 may cause the diagonal planar facets to be triangular.

In the illustrated implementation, perimeter corners created by adjoining straight perimeter edges may provide more pronounced tactile feedback of facet boundaries relative to the circular dish shape of the finger pad 114 that may be desirable to some users. Moreover, such an implementation may have a smaller footprint relative to the finger pad 114 that may be applicable for smaller game controllers with tighter spacing between controls.

In still other implementations, the cardinal planar facets and/or the diagonal planar facets may have differently-shaped perimeter edges. For example, perimeter edges may be arced toward a center planar facet to further pronounce perimeter corners between cardinal facets and diagonal facets (or gaps).

Figure 11:
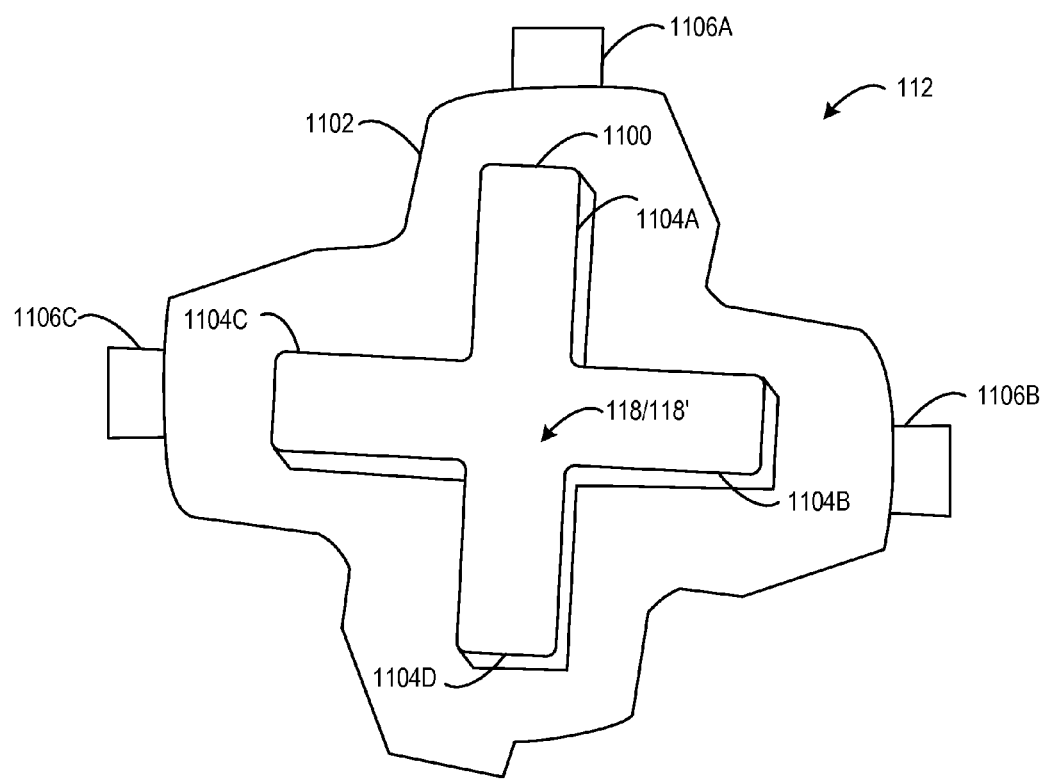
FIG. 11 shows a topside of the mounting platform of FIG. 2.
Figure 12:
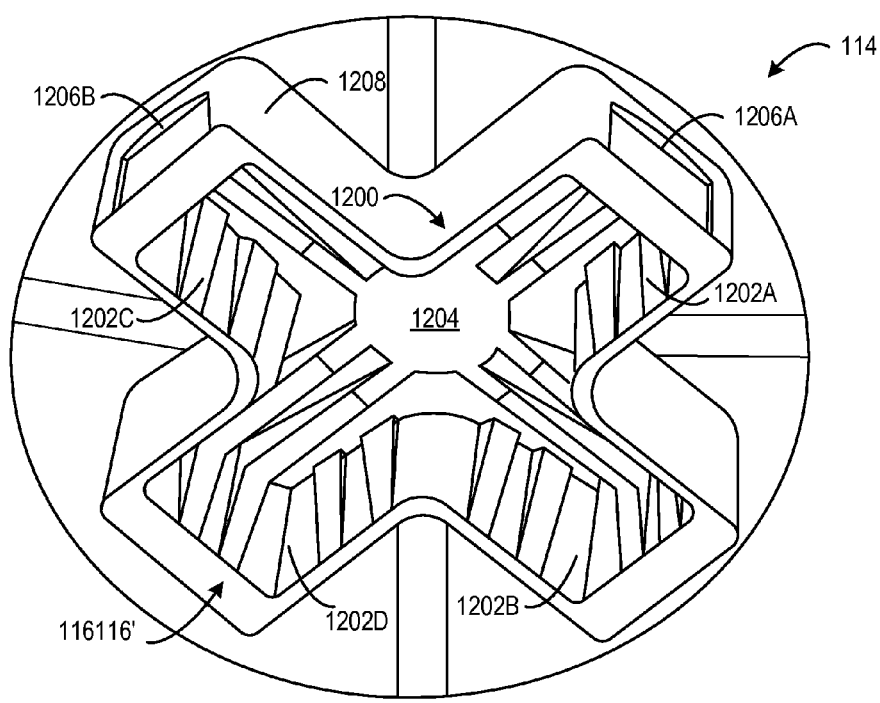
FIG. 12 shows an underside of the removable controller accessory of FIGS. 1-2.

FIGS. 11 and 12 show interfacing sides of the mounting platform 112 and the removable finger pad 114. In particular, FIG. 11 shows the topside 118 (e.g., the accessory-retention interface) of the mounting platform 112. The mounting platform 112 includes a cross-shaped protrusion 1100 that extends from a base piece 1102. The cross-shaped protrusion includes a plurality of branches 1104 (e.g., 1104A, 1104B, 1104C, 1104D) that extend in different directions (e.g., up, down, left, right). In the depicted implementation, each of the plurality of branches 1104 have the same length. In other implementations, different branches of the cross-shaped protrusion 1100 may have different lengths. The mounting platform 112 may include any suitable number of branches that extend in any suitable direction(s).

Furthermore, the base piece 1102 includes a plurality of mounting tabs 1106 (e.g., 1106A, 1106B, 1106C) that are configured to interact with the frame 120 (shown in more detail in FIG. 17) to couple the mounting platform 112 to the game controller 100. When the mounting platform 112 is coupled to the frame 120, the plurality of mounting tabs 1106 may be inserted into corresponding mounting brackets 902 (shown in FIG. 17) of the frame 120 to inhibit the mounting platform 112 from twisting in the game controller 100. In some implementations, the mounting platform 112 may include an accessory-retention interface 118 having a non-branch shape. For example, the accessory-retention interface 118 may include a circle, triangle, square, star, or other shape.

FIG. 12 shows the underside 116 of the removable finger pad 114. The underside 116 may include a mounting interface 116' configured to have a shape that complements the shape of the accessory-retention interface (e.g., the cross-shaped protrusion 1100) of the mounting platform 112. In particular, the underside 116 of the removable finger pad 114 may be concave to form a hollowed out cross-shaped cavity 1200 including a plurality of valleys 1202 (e.g., 1202A, 1202B, 1202C, 1202D). The cross-shaped cavity 1200 may be sized slightly larger than the cross-shaped protrusion 1100 such that when the removable finger pad 114 is installed on the mounting platform 112, the cross-shaped cavity 1200 covers the cross-shaped protrusion 1100. In particular, the plurality of valleys 1202 may extend downward over the plurality of branches 1104. In one example, the height of the cross-shaped protrusion 1100 may be at least as great as a depth of the cross-shaped cavity 1200 such that when the removable finger pad 114 is installed on the mounting platform 112, a floor 1204 of the cross-shaped cavity 1200 rests on the cross-shaped protrusion 1100.

Furthermore, the removable finger pad 114 may include a plurality of grip notches 1206 (e.g., 1206A, 1206B). Each of the plurality of grip notches 1206 may be positioned on an exterior side 1208 of each branch of the cross shape that spans between the topside 115 and the underside 116. The plurality of grip notches 1206 may be configured to be gripped by fingers of a user to facilitate easy removal of the removable finger pad 114 from the mounting platform 112. The removable finger pad 114 may include any suitable number of grip notches 1206, including zero grip notches.

The removable finger pad 114 may be made at least partially of ferromagnetic material, and the removable finger pad 114 may be removably affixable to the mounting platform 112 through a magnetic attraction between a plurality of magnets 1306 (shown in FIG. 13) and the ferromagnetic material of the removable finger pad 114. In some implementations, the removable finger pad 114 may be a single ferromagnetic metal part. For example, the metal part may be injection-molded. In another example, the part may be machined from a single piece of metal. In other implementations, the removable finger pad 114 may be an assembly including one or more ferromagnetic parts.

Figure 13:
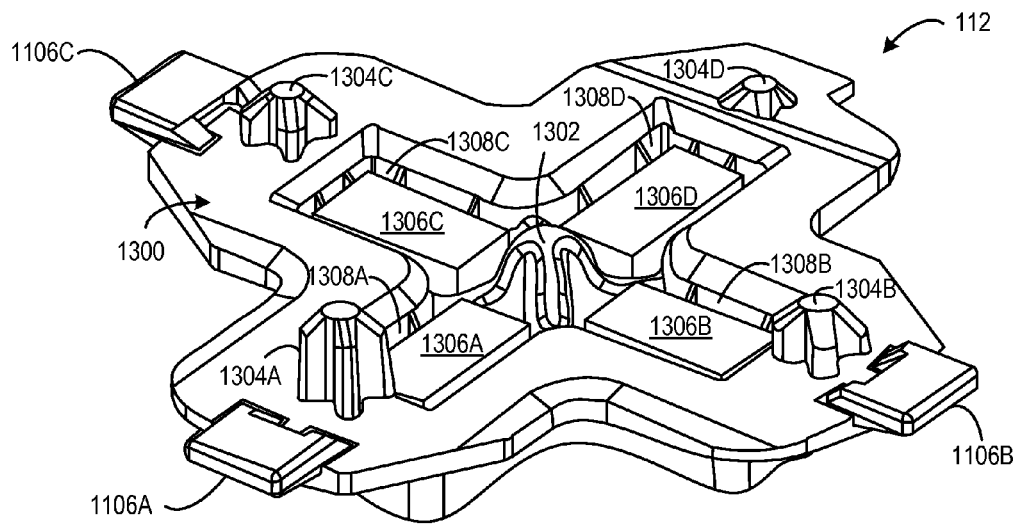
FIG. 13 shows an underside of the mounting platform of FIG. 2.
Figure 14:
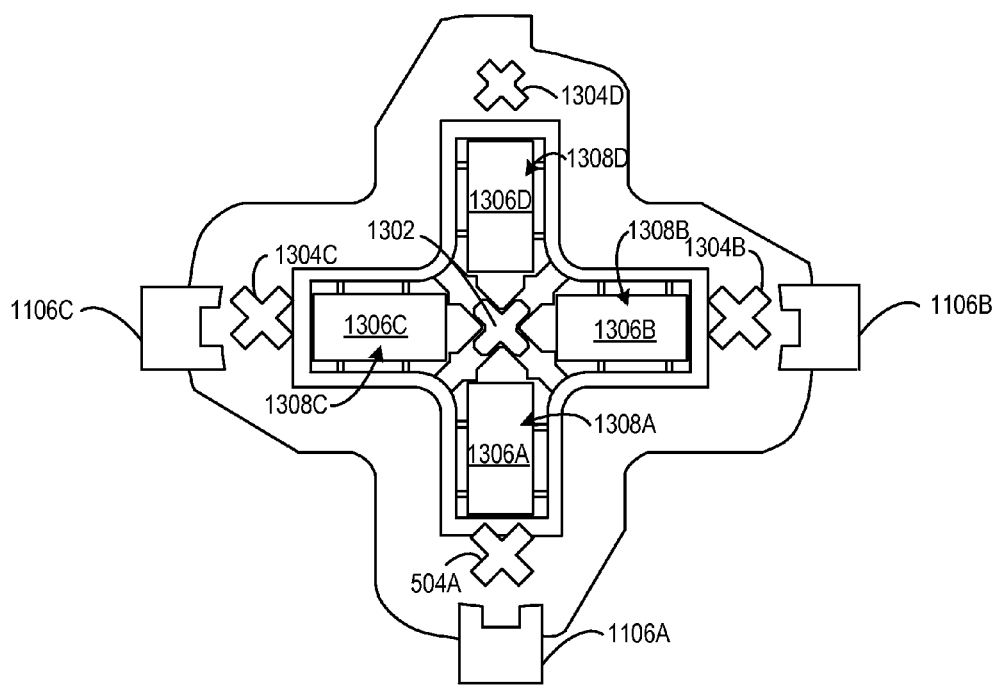
FIG. 14 shows the underside of the mounting platform of FIG. 2.
Figure 17:
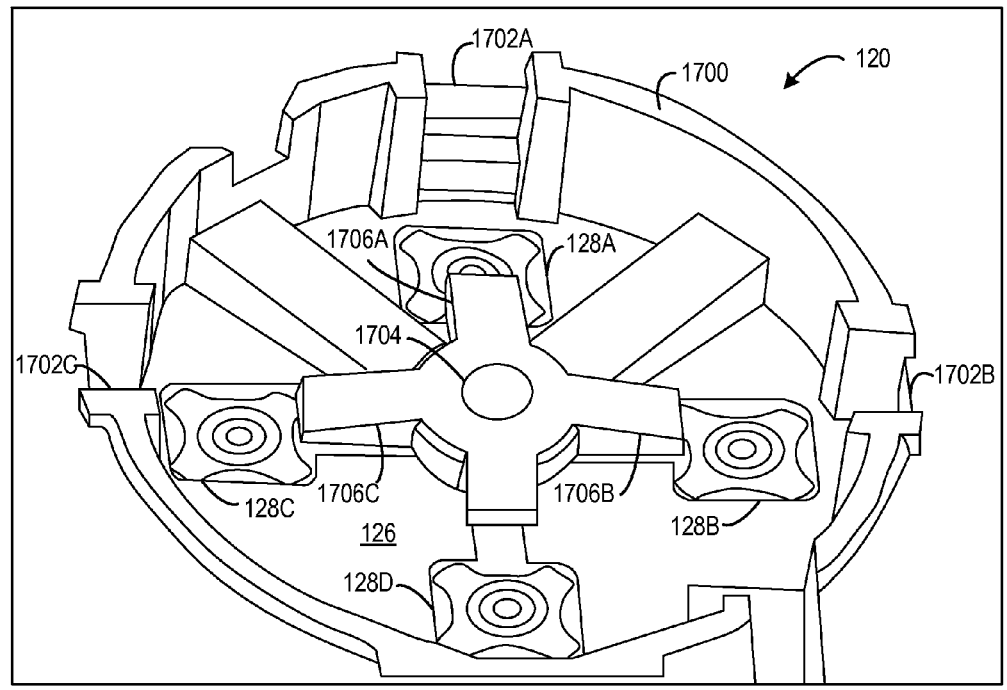
FIG. 17 shows a portion of a frame of the game controller of FIGS. 1-2.

FIG. 13-14 show an underside 1300 of the mounting platform 112. The underside 1300 of the mounting platform 112 may be configured to interface with the frame 120 (as shown in FIG. 17) to couple the mounting platform 112 to the game controller 100. In particular, the mounting platform 112 may include a pivot piece 1302 configured to interface with a socket 1704 (shown in FIG. 17) of the frame 120. The socket 1704 and the pivot piece 1302 may collectively form a joint about which the mounting platform 112 is pivotable in a plurality of directions (e.g., up, down, left, right) relative to the frame 120. The pivot piece 1302 may be positioned in the center of the mounting platform 112 such that the mounting platform 112 may pivot in a similar manner (e.g., angle, distance) in each direction. Moreover, the plurality of mounting tabs 1106 of the mounting platform 112 may be inserted into the corresponding plurality of mounting brackets 1702 of the frame 120 to inhibit the mounting platform 112 from twisting relative to the frame 120, when the mounting platform 112 pivots in a particular direction.

The mounting platform 112 may assume a directionally-neutral default posture when the pivot piece 1302 is centered in the socket 1704. Further, the mounting platform 112 may be configured to move from the default posture to an activation posture in which the mounting platform 112 pivots away from the directionally-neutral default posture. For example, the mounting platform 112 may move from the default posture to a selected activation posture responsive to a touch force being applied to the removable finger pad 114.

In some implementations, the mounting platform 112 may be configured to pivot into any one of four activation postures corresponding to the plurality of branches 1104 of the mounting platform 112. In other implementations, the mounting platform 112 may be configured to pivot into any one of eight activation postures corresponding to the plurality of branches 1104 as well as the diagonals between the branches. In other implementations, the mounting platform 112 may be configured to pivot into any one of a number of activation postures other than four or eight. For example, the mounting platform 112 may be configured to pivot into any one of two or more activation postures.

The mounting platform 112 may include a plurality of sensor-activation features herein depicted in the form of projections 1304 (e.g., 1304A, 1304B, 1304C, 1304D). The plurality of projections 1304 may be positioned on the underside 1300 of the mounting platform 112 to align with a plurality of electronic input sensors 128 (e.g., 128A, 128B, 128C, 128D shown in FIG. 17) when the mounting platform 112 is coupled to the frame 120. In particular, when the mounting platform 112 is in the default posture, the plurality of projections 1304 may hang over (or touch) the plurality of electronic input sensors 128 without activating the plurality of electronic input sensors 128. In other words, when the mounting platform is in the default posture, none of the electronic input sensors 128 may generate an activate control signal indicative of user input.

Furthermore, when the mounting platform 112 moves from the default posture to a selected activation posture, one or more projections 1304 may interface with one or more corresponding electronic input sensors 128 to generate one or more activate control signals indicative of user input. For example, when an "up" touch force is applied to the removable finger pad 114, projection 1304A is pushed into corresponding electronic input sensor 128A to generate an activate control signal indicative of user input in the "up" direction.

The projections 1304 are merely one non-limiting example of a sensor-activation feature of the mounting platform 112. A sensor-activation feature may take any suitable form. Moreover, the mounting platform 112 may include any suitable number of sensor-activation features configured to interface with any suitable number of electronic input sensors.

The mounting platform 112 may include a plurality of accessory-retention features herein depicted in the form of magnets 1306 (e.g., 1306A, 1306B, 1306C, 1306D) configured to removably affix the removable finger pad 114 to the mounting platform 112. The plurality of magnets 1306 may be positioned in a plurality of troughs 1308 (e.g., 1308A, 1308B, 1308C, 1308D) formed underneath the cross-shaped protrusion 1100 (shown in FIG. 11). The plurality of troughs 1308 may have a depth to accommodate the plurality of magnets 1306 such that the plurality of magnets are at least flush (or recessed) with the underside 1300 of the mounting platform 112. The plurality of magnets 1306 may be coupled to the plurality of troughs 508 in any suitable manner. For example, the plurality of magnets 1306 may be coupled to the plurality of troughs 1308 using pressure-sensitive adhesive.

Figure 15:
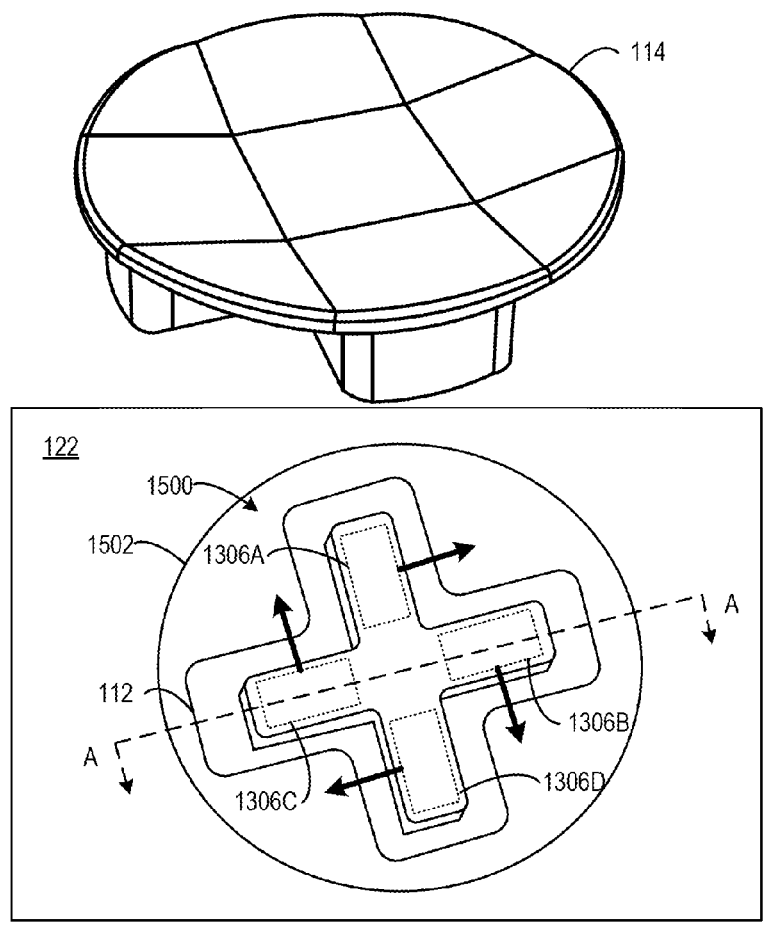
FIG. 15 shows the removable controller accessory aligned to be installed on the mounting platform of the game controller of FIGS. 1-2.
Figure 16:
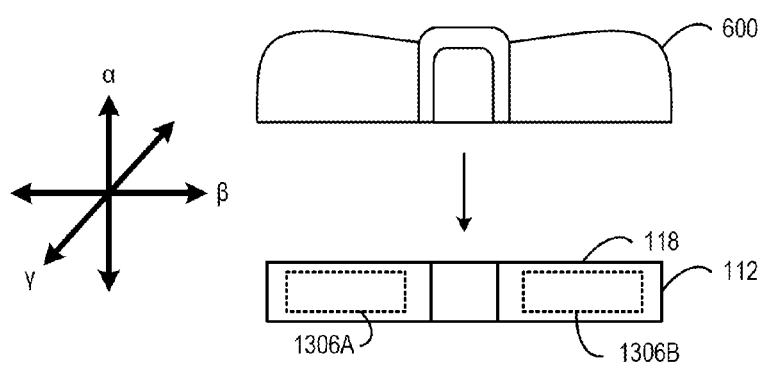
FIG. 16 shows a sectional view of the removable controller accessory and the mounting platform of the game controller of FIGS. 1-2 taken along line A-A of FIG. 7.

FIGS. 15-16 show removable finger pads aligned to be installed on the mounting platform 112. In FIG. 15, the mounting platform 112 is mounted to the frame 120 (as shown in FIG. 17), and the mounting platform 112 protrudes through an aperture 1500 defined by a rim 1502 located on the upper housing portion 122. The removable finger pad 114 may be removably affixed to the mounting platform 112. In FIG. 16, a removable finger pad 600 is removably affixable to the mounting platform 112 along an interface direction (a). Further, the plurality of magnets 1306 each may be positioned such that a pole of each magnet extends in a direction (e.g., β or γ) that is not parallel to the interface direction (a) between the removable finger pad 600 and the mounting platform 112. In one particular example, the pole of each magnet may extend in a direction that is perpendicular to the interface direction (a). Further, each magnet may be positioned such that a pole of the magnet is orientated in a direction that is rotated ninety degrees away from a pole of each neighboring magnet.

Referring back to FIGS. 11-14, such a magnet orientation may allow the removable finger pad 114 to slide beyond the topside 118 of the mounting platform 112 to allow the removable controller accessory to cover the mounting platform 112. If the plurality of magnets were oriented such that a pole of each magnet extended in the interface direction (a) or a direction parallel to the interface direction, then the underside 116 of the removable finger pad 114 would be attracted to the topside 118 of the mounting platform 112. Such a configuration would make it difficult for the valleys 1202 of the removable finger pad 114 to slide over the branches 1104 of the cross-shaped protrusion 1100.

Note that the corresponding cross-shaped features of the mounting platform 112 and the removable finger pad 114 as well as the corresponding plurality of magnets and the ferromagnetic material all may act as accessory-retention features that contribute to making the removable finger pad 114 removably affixable to the mounting platform 112. In particular, the corresponding cross-shaped features of the mounting platform 112 and the removable finger pad 114 may cooperate to initially align the removable finger pad 114 with the mounting platform 112. Further, the plurality of magnets 1306 and the ferromagnetic material may cooperate to retain the removable finger pad 114 affixed to the mounting platform 112.

Any suitable number of magnets 1306 may be employed to removably affix the removable finger pad 114 to the mounting platform 112. Moreover, such magnets 1306 may take any suitable form. For example, a single large ring magnet may be used in place of the four rectangular magnets of the depicted implementation. In order to accommodate a ring magnet, the mounting platform 112 and the removable finger pad 114 may have a circular or toroidal shape instead of a cross shape. Such an implementation would still allow for the pivot piece 1302 to be positioned at the center of the mounting platform 112. Further, the plurality of magnets 1306 may be oriented in the mounting platform 112 according to any suitable orientation.

Furthermore, in some implementations, the removable finger pad 114 may include magnets and the mounting platform 112 may be made at least partially of ferromagnetic material that is configured to be attracted to the plurality of magnets of the removable finger pad 114. In some implementations, both the removable finger pad 114 and the mounting platform 112 may include magnets that are configured to be attracted to each other.

FIG. 17 shows a portion of the frame 120 without the mounting platform 112 installed on the frame 120. The plurality of mounting brackets 1702 may be used to align the mounting platform 112 with the frame 120 such that the pivot piece 1302 may interface with the socket 1704 to collectively form a joint about which the mounting platform 112 is pivotable in a plurality of directions relative to the frame 120. Further, the plurality of mounting brackets 1702 (e.g., 1702A, 1702B, 1702C) may be sunken below a rim 1700 of the frame 120 in order to accommodate the plurality of mounting tabs 1106 such that the mounting platform 112 may be prevented from twisting relative to the frame 120 when the mounting platform 112 pivots in a given direction.

The printed circuit board 126 may be coupled beneath the frame 120 such that the plurality of electronic input sensors, depicted herein in the form of a plurality of dome switches 128 (e.g., 128A, 128B, 128C, 128D), may be aligned to interact with the plurality of projections 504 when the mounting platform 112 is installed on the frame 120. In particular, the plurality of dome switches 128 may be recessed relative to the frame 120, and more particularly relative to the socket 1704 such that when the mounting platform 112 is in the default posture, the plurality of projections 1304 do not activate the plurality of dome switches 128. Moreover, when the mounting platform 112 pivots from the default posture to an activation posture in a particular direction, a projection 1304 corresponding to the direction may be lowered to activate a corresponding dome switch 128.

The frame 120 includes a plurality of supports 1706 (e.g., 1706A, 1706B, 1706C, 1706D) that extend out from the socket 1704. The plurality of supports 1706 may be positioned to align with the plurality of troughs 1308 of the mounting platform 112 when the mounting platform 112 is installed on the frame 120. In particular, each support may be configured to extend at least to an opening of a corresponding trough to maintain a magnet in the trough when the mounting platform 112 is installed on the frame 1120. The plurality of supports 1706 may act as magnet retention features that may keep the magnets in the troughs even when an adhesive or other coupling mechanism fails.

Figure 18:
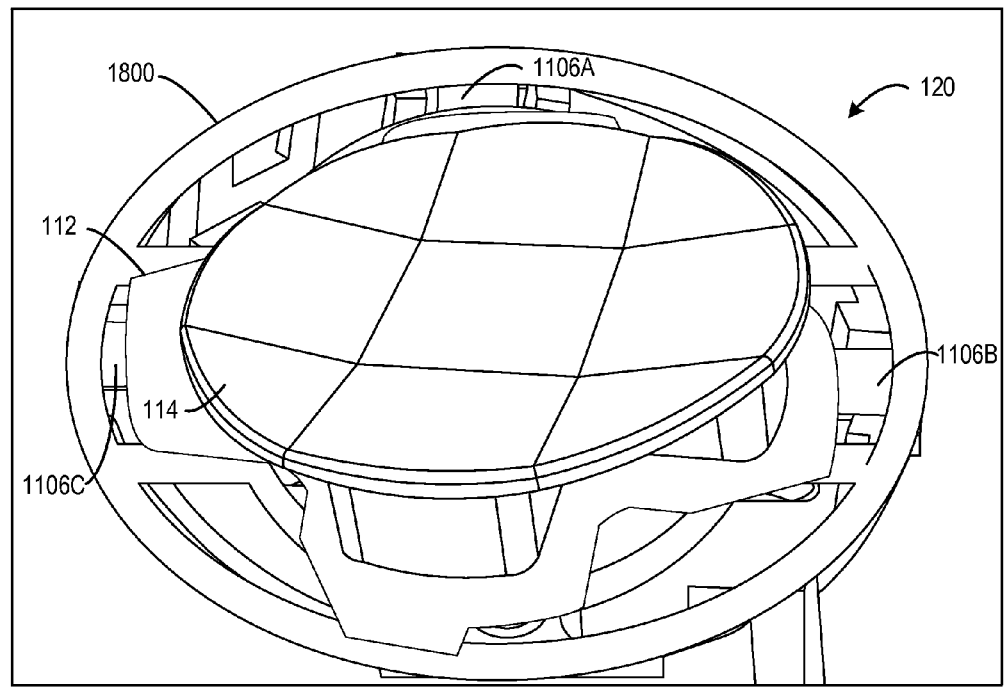
FIG. 18 shows a partial cutaway view of the portion of the frame of FIG. 9 with the mounting platform installed on the frame, the removable controller accessory removably affixed to the mounting platform, and an upper housing portion removed.

FIG. 18 shows a portion of the frame 120 with the mounting platform 112 installed on the frame 120, the removable finger pad 114 removably affixed to the mounting platform 112, and the upper housing portion 122 removed to show the underlying structure. In particular, a spring clip 1800 may be positioned between the frame 120 and the mounting platform 112, and the plurality of mounting tabs 1106 may extend under the spring clip 1800 to couple the mounting platform 112 to the frame 120. The spring clip 1800 may be configured to return the mounting platform 112 from an activation posture to the default posture when a touch force to the removable finger pad 114 has been lifted. For example, when the removable finger pad 114 is depressed, the spring clip 1800 resists the depressions and biases the removable finger pad 114 towards popping back up to the default posture. Note that the spring clip 1800 may be covered by the upper housing portion 122 (shown in FIG. 2) of the game controller 100, and the mounting platform 112 may be exposed via the aperture 1500 (as shown in FIG. 15) defined by the rim 1502 located on the upper housing portion 122.

In some implementations, different variations of the removable finger pad 114 having differing attributes may be swapped on the mounting platform 112. Non-limiting examples of such differing attributes, may include different branch thickness of the cross shape, different cross height, different branch angles, different materials, different surface textures, additional tactile features (e.g., bumps), different colors, different artwork, and other attributes.

Figure 19:
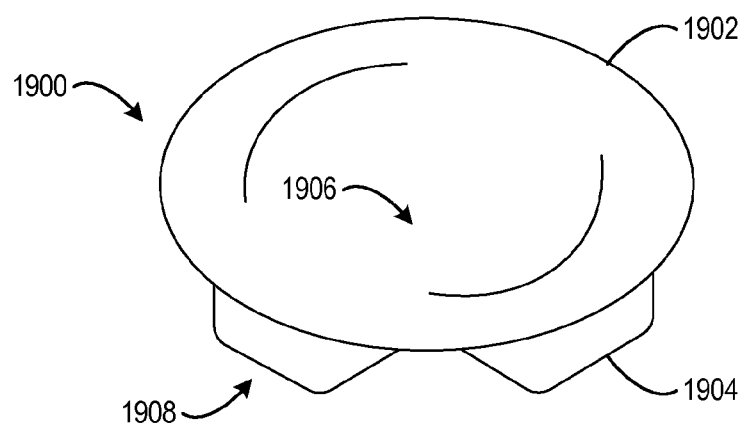
FIG. 19 shows an example removable controller accessory having a finger interface that includes a concave dish having a smooth surface.
Figure 20:
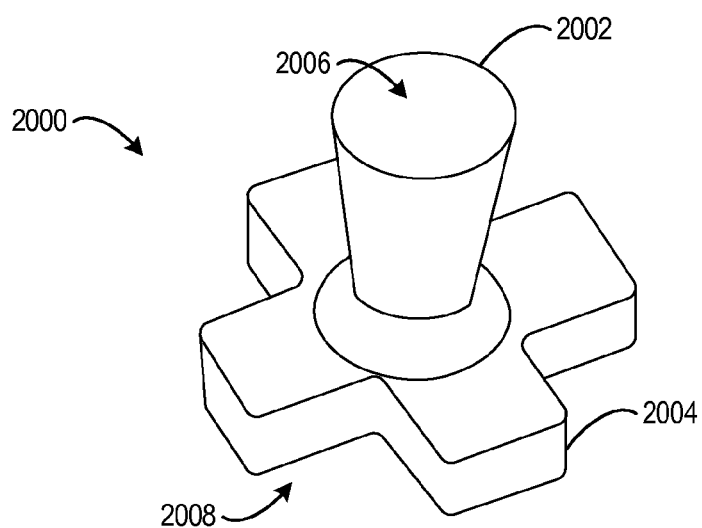
FIG. 20 shows an example removable controller accessory having a finger interface that includes a joystick.

In some implementations, differently configured removable controller accessories other than a removable finger pad may be removably affixed to the mounting platform 112. FIGS. 19-20 show non-limiting examples of some such removable controller accessories. FIG. 19 shows a removable controller accessory 1900 including a topside 1902 and an underside 1904 opposite the topside 1902. The topside 1902 includes a finger interface 1906 sized and shaped for manual manipulation by a finger. In the depicted implementation, the finger interface 1906 includes a concave dish having a smooth surface. Such a finger interface may mimic a contour of a user's thumb. For example, the smooth surface of the rounded dish may be useful for applications where large circular rotations of the directional pad may be performed frequently. In another implementation, the finger interface 1906 may have a convex shape. In another implementation, the finger interface 1906 may include a concave dish having a textured surface (e.g., bumps, ridges, depressions, or patterns). For example, the finger interface 1906 may include textured markers (e.g., bumps) that indicate different directions in which the removable controller accessory 1900 may be manually manipulated by a finger. In one example, the removable controller accessory 1900 may include four textured markers positioned to indicate the four cardinal directions. In another example, the removable controller accessory 1900 may include eight textured markers positioned to indicate the four cardinal directions and the four diagonal directions.

Furthermore, the underside 1904 includes a mounting interface 1908 configured to selectively mate with an accessory-retention feature of the mounting platform 112 of the game controller 100 to removably affix the removable controller accessory 1900 to the mounting platform 112. In the depicted implementation, the mounting interface 1908 may include a cross-shaped concave cavity that is configured to mate with the cross-shaped protrusion 1100 of the mounting platform 112. In other words, the mounting interface 1908 may have features that compliment features of the mounting interface 116' of the removable finger pad 114 (shown in FIG. 12). In some implementations, the removable controller accessory 1900 may be made at least partially of ferromagnetic material that is configured to have a magnetic attraction to the magnets 1306 of the mounting platform 112.

FIG. 20 shows a removable controller accessory 2000 including a topside 2002 and an underside 2004 that is opposite the topside 2002. The topside 2002 includes a finger interface 2006 depicted in the form of a joystick. The joystick may provide a movable shaft or lever that can be easily flicked in a particular direction. For example, such a lever may be useful for applications where the same control (or direction) is activated repeatedly, such as to scroll through items in an inventory. Furthermore, the underside 2004 includes a mounting interface 2008 configured in the same manner as the mounting interface 1908 of the removable controller accessory 1900.

Because the removable controller accessories 114, 1900, and 2000 all have similarly configured mounting interfaces that are configured to mate with the mounting platform 112, each of these removable controller accessories may be quickly and easily swapped on the game controller 100.

In some implementations, the mounting platform 112 of the game controller 100 alternatively or additionally may include one or more non-magnetic accessory-retention features. Moreover, in such implementations, a removable controller accessory may include a mounting interface configured to mate with such accessory-retention features to removably affix the removable controller accessory to the mounting platform.

Figure 21:
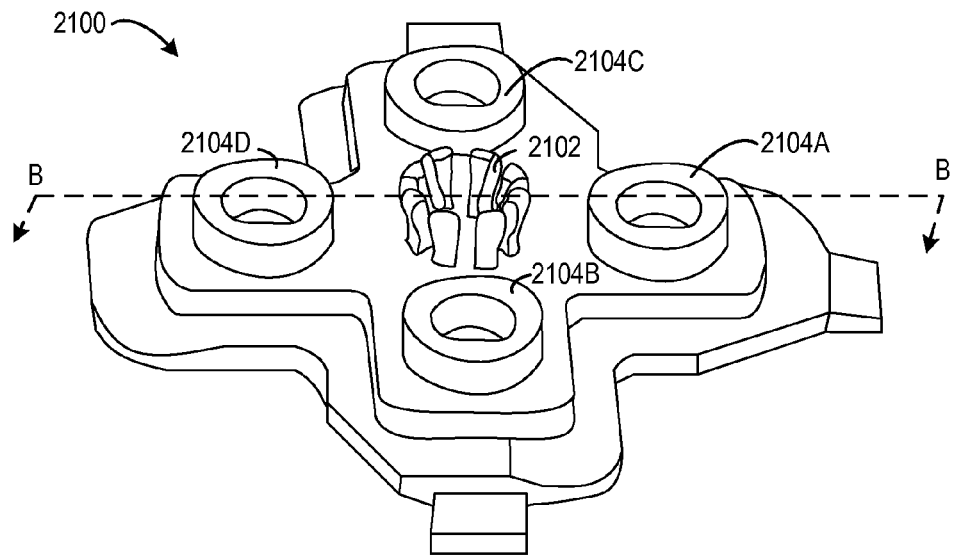
FIG. 21 shows an example mounting platform including a snap fastener and corresponding alignment features.
Figure 22:
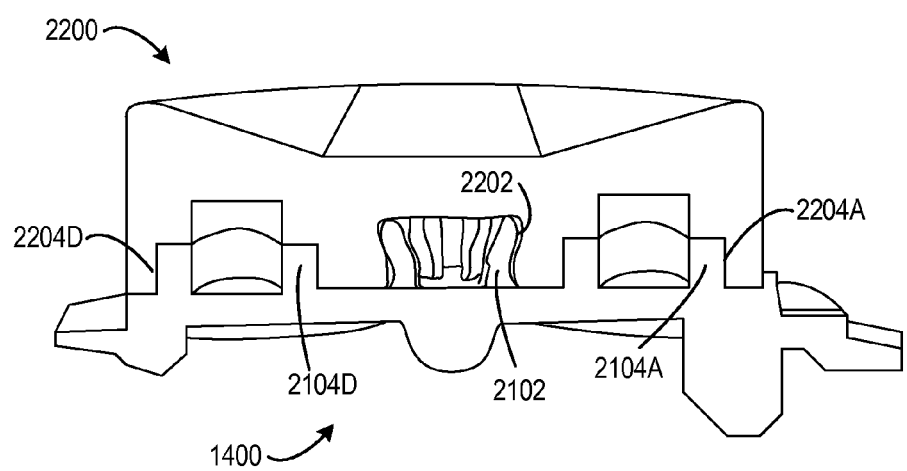
FIG. 22 shows a sectional view of an example removable controller accessory including a mating feature and corresponding alignment features configured interface to with the mounting platform taken along line B-B of FIG. 21.

FIGS. 21-22 show an example configuration in which a snap fastener is employed as an accessory-retention feature to removably affix a removable controller accessory 2000 to a mounting platform 2100. In particular, the mounting platform 2100 includes a snap fastener 2102. The snap fastener 2102 may be configured to interlock with a corresponding mating feature 2202 of the removable controller accessory 2200 to removably affix the removable controller accessory 2200 to the mounting platform 2100. In the depicted implementation, the mounting platform 2100 also includes a plurality of alignment features 2104 (e.g., 2104A, 2104B, 2104C, 2104D) configured to fit into a plurality of cavities 2204 (e.g., 2204A, 2204B, 2204C, 2204D) of the removable controller accessory 2200 to prevent the removable controller accessory 2200 from translating or rotating relative to the mounting platform 2100.

Any suitable number of cooperating snap fasteners, mating features, and/or alignment features may be employed on the mounting platform 2100 and the removable controller accessory 2200 to removably affix the removable controller accessory 2200 to the mounting platform 2100. Moreover, the snap fasteners may take any suitable form. Furthermore, the snap fasteners may be positioned either at the center of the mounting platform, towards the extremities, or both. In some implementations, the snap fastener(s) 2102 may be located on the removable controller accessory 2200 and the mating feature(s) 2202 may be located on the mounting platform 2100. In some implementations, a subset of snap fasteners and mating features may be located on the removable controller accessory 2200 and another subset of snap fasteners and mating features may be located on the mounting platform 2100.

Figure 23:
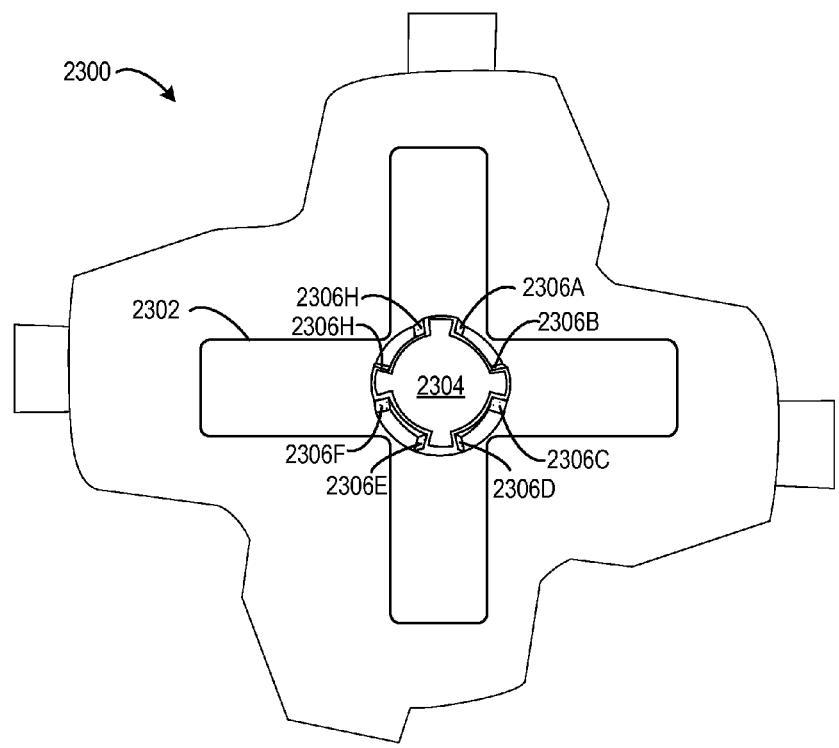
FIG. 23 shows a topside of an example mounting platform including wedge fasteners.
Figure 24:
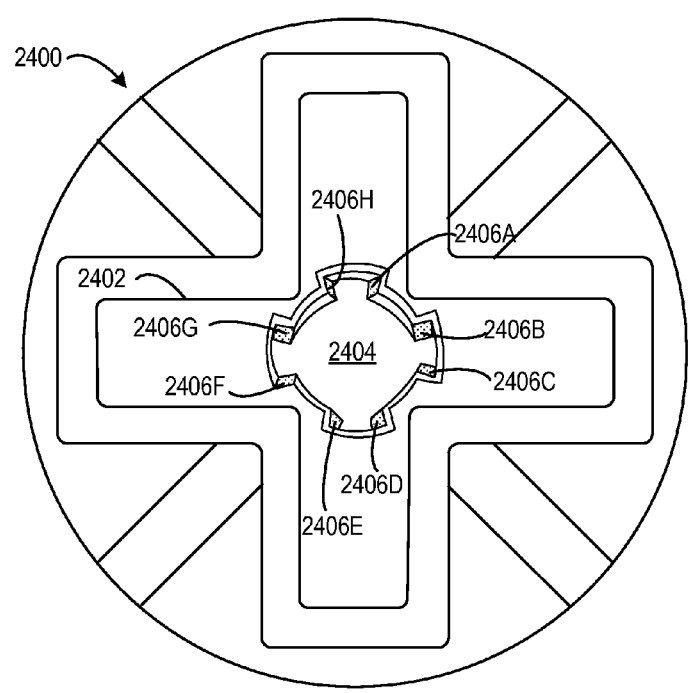
FIG. 24 shows an underside of an example removable controller accessory including wedge fasteners that are configured to selectively mate with the wedge fasteners of the mounting platform of FIG. 23.

FIGS. 23-24 show an example configuration in which complimentary wedge surfaces are employed as accessory-retention features to removably affix a removable controller accessory 2400 to a mounting platform 2300. The mounting platform 2300 includes a cross-shaped alignment feature 2302. The alignment feature 2302 may be either raised or depressed to align with a cross-shaped alignment feature 2402 of the removable controller accessory 2400.

The mounting platform 2300 includes a protrusion 2304 that includes a plurality of wedge surfaces 2306 (e.g., 2306A, 2306B, 2306C, 2306D, 2306E, 2306F, 2306G, 2306H). Further, the removable controller accessory 2400 includes a cavity 2404 that includes a plurality of wedge surfaces 2406 (e.g., 2406A, 2406B, 2406C, 2406D, 2406E, 2406F, 2406G, 2406H). When the removable controller accessory 2400 is removably affixed to the mounting platform 2300, the cavity 2404 may mate with the protrusion 2304 of the mounting platform such that complimentary wedge surfaces of the mounting platform 2300 and the removable controller accessory 2400 interface with each other. In particular, friction between the complimentary wedge surfaces may removably affix the removable controller accessory 2400 to the mounting platform 2300. In some implementations, the complimentary wedge surfaces may have high-friction textures that increase friction between complimentary wedge surfaces. The mounting platform 2300 and the removable controller accessory 2400 may include any suitable number of complimentary pairs of wedge surfaces. Moreover, the complimentary pairs of wedge surfaces may take any suitable form (e.g., different angles, lengths, orientations).

Figure 25:
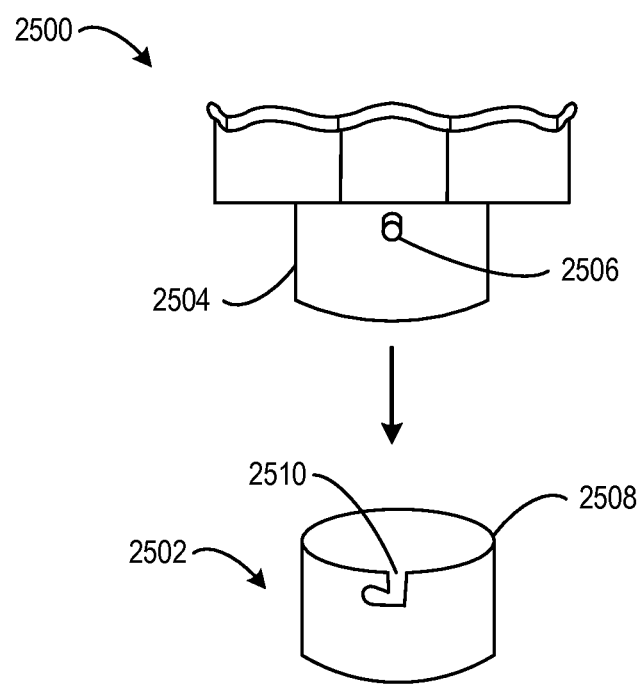
FIG. 25 shows an example removable controller accessory including a male portion of a twist-to-lock mechanism and an example mounting platform including a female portion of a twist-to-lock mechanism.
Figure 26:
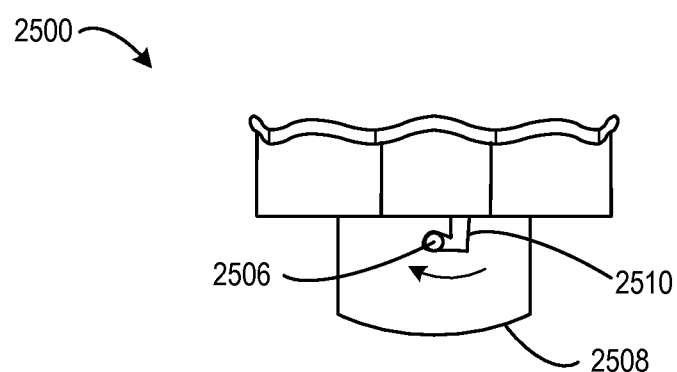
FIG. 26 shows the removable controller accessory of FIG. 25 removably affixed to the mounting platform via the twist-to-lock mechanism.

FIGS. 25-26 show an example configuration in which a twist-to-lock mechanism is employed as an accessory-retention feature to removably affix a removable controller accessory 2500 to a mounting platform 2502. The removable controller accessory 2500 includes a male portion 2504 and a radial pin 2506 that extends radially outward from the male portion 2504. Further, the mounting platform 2502 includes a female portion 2508 having a side in which an L-shaped slot 2510 is formed. The male portion 2504 may be inserted into the female portion 2508 until the radial pin 2506 is stopped at a heel of the L-shaped slot 2510. The removable controller accessory 2500 may be rotated clockwise to move the radial pin 2506 to a toe of the L-shaped slot 2510 to affix the removable controller accessory 2500 to the mounting platform 2502.

The twist-to-lock mechanism may take any suitable form. For example, the removable controller accessory may include any suitable number of radial pins. In another example, the mounting platform 2502 may include a slot having any suitable shape. In some implementations, the male portion may be biased upward such that radial pin is pushed upward into a toe catch of an L-shaped slot. In another example, the radial pin may be outwardly biased, and the toe of the slot may include a depressible catch. In such a configuration the catch may be depressed to release the pin from the toe in order for the male portion to be twisted relative to the female portion.

In other implementations, the mounting platform and the removable controller accessory may include cooperating screw threads that act as accessory-retention features to removably affix the removable controller accessory to the mounting platform by screwing the removable controller accessory onto the mounting platform.

Although the concept of swappable accessories are discussed mainly in the context of a game controller, such concepts may be broadly applicable to any suitable user input control device.

In another example implementation, a removable finger pad for a game controller comprises a first side and a second side opposite the first side. The first side includes a finger interface, The finger interface includes a center planar facet having an up edge parallel to a left-right axis, a right edge parallel to an up-down axis, a down edge parallel to the left-right axis, and a left edge parallel to the up-down axis, a cardinal-up planar facet sharing the up edge with the center planar facet and extending at a ramp angle from the center planar facet, a cardinal-right planar facet sharing the right edge with the center planar facet and extending at the ramp angle from the center planar facet, a cardinal-down planar facet sharing the down edge with the center planar facet and extending at the ramp angle from the center planar facet, and a cardinal-left planar facet sharing the left edge with the center planar facet and extending at the ramp angle from the center planar facet. The second side includes a mounting interface configured to selectively mate with a mounting platform of the game controller to removably affix the removable finger pad to the mounting platform. In one example implementation that optionally may be combined with any of the features described herein, the cardinal-up planar facet is bordered by the up edge, an up-left ramp edge parallel to the up-down axis, an up-right ramp edge parallel to the up-down axis, and an up-perimeter edge. The cardinal-right planar facet is bordered by the right edge, a right-up ramp edge parallel to the left-right axis, a right-down ramp edge parallel to the left-right axis, and a right-perimeter edge. The cardinal-down planar facet is bordered by the down edge, a down-right ramp edge parallel to the up-down axis, a down-left ramp edge parallel to the up-down axis, and a down-perimeter edge. The cardinal-left planar facet is bordered by the left edge, a left-down ramp edge parallel to the left-right axis, a left-up ramp edge parallel to the left-right axis, and a left-perimeter edge. In one example implementation that optionally may be combined with any of the features described herein, the up-left ramp edge, the up-right ramp edge, the right-up ramp edge, the right-down ramp edge, the down-right ramp edge, the down-left ramp edge, the left-down ramp edge, and the left-up ramp edge are perimeter edges. In one example implementation that optionally may be combined with any of the features described herein, the up-left ramp edge, the up-right ramp edge, the down-right ramp edge, and the down-left ramp edge are parallel with the up-down axis, and wherein the right-up ramp edge, the right-down ramp edge, the left-down ramp edge, and the left-up ramp edge are parallel with the left-right axis. In one example implementation that optionally may be combined with any of the features described herein, the up-left ramp edge, the up-right ramp edge, the right-up ramp edge, the right-down ramp edge, the down-right ramp edge, the down-left ramp edge, the left-down ramp edge, and the left-up ramp edge have a same ramp angle. In one example implementation that optionally may be combined with any of the features described herein, the up-perimeter edge is higher than the up edge, the right-perimeter edge is higher than the right edge, the down-perimeter edge is higher than the down edge, and the left-perimeter edge is higher than the left edge. In one example implementation that optionally may be combined with any of the features described herein, the finger interface includes a diagonal up-right planar facet bordered by the up-right ramp edge, the right-up ramp edge, and an up-right perimeter edge, a diagonal down-right planar facet bordered by the right-down ramp edge, the down-right ramp edge, and a down-right perimeter edge, a diagonal down-left planar facet bordered by the down-left ramp edge, the left-down ramp edge, and a down-left perimeter edge, and a diagonal up-left planar facet bordered by the left-up ramp edge, the up-left ramp edge, and an up-left perimeter edge. In one example implementation that optionally may be combined with any of the features described herein, the up-right perimeter edge, the down-right perimeter edge, the down-left perimeter edge, and the up-left perimeter edge are straight. In one example implementation that optionally may be combined with any of the features described herein, the up-right perimeter edge, the down-right perimeter edge, the down-left perimeter edge, and the up-left perimeter edge are rounded.

In another example implementation, a removable finger pad for a game controller comprises a first side and a second side opposite the first side. The first side includes a finger interface. The finger interface includes a plurality of planar facets sized and shaped for manual manipulation by a finger. The second side includes a mounting interface configured to selectively mate with a mounting platform of the game controller to removably affix the removable finger pad to the mounting platform. In one example implementation that optionally may be combined with any of the features described herein, the plurality of planar facets include a center planar facet and four cardinal planar facets. Each cardinal planar facet neighboring the center planar facet. In one example implementation that optionally may be combined with any of the features described herein, each cardinal planar facet includes an inner edge and a perimeter edge positioned higher than the inner edge, such that each cardinal planar facet ramps upward from the center planar facet. In one example implementation that optionally may be combined with any of the features described herein, the perimeter edge of each cardinal planar facet is rounded. In one example implementation that optionally may be combined with any of the features described herein, the perimeter edge of each cardinal planar facet is straight. In one example implementation that optionally may be combined with any of the features described herein, the plurality of planar facets include four diagonal planar facets. Each diagonal planar facet neighbors the center planar facet, and each diagonal planar facet is positioned between a different pair of cardinal planar facets of the four cardinal planar facets. In one example implementation that optionally may be combined with any of the features described herein, each diagonal planar facet includes an inner corner and a perimeter edge positioned higher than the inner corner such that each diagonal planar facet ramps upward from the center planar facet.

In another example implementation, a game controller comprises a finger pad having a finger interface. The finger interface includes a center planar facet having an up edge parallel to a left-right axis, a right edge parallel to an up-down axis, a down edge parallel to the left-right axis, and a left edge parallel to the up-down axis, a cardinal-up planar facet sharing the up edge with the center planar facet and extending at a ramp angle from the center planar facet, a cardinal-right planar facet sharing the right edge with the center planar facet and extending at the ramp angle from the center planar facet, a cardinal-down planar facet sharing the down edge with the center planar facet and extending at the ramp angle from the center planar facet, and a cardinal-left planar facet sharing the left edge with the center planar facet and extending at the ramp angle from the center planar facet. In one example implementation that optionally may be combined with any of the features described herein, the cardinal-up planar facet is bordered by the up edge, an up-left ramp edge parallel to the up-down axis, an up-right ramp edge parallel to the up-down axis, and an up-perimeter edge. The cardinal-right planar facet is bordered by the right edge, a right-up ramp edge parallel to the left-right axis, a right-down ramp edge parallel to the left-right axis, and a right-perimeter edge. The cardinal-down planar facet is bordered by the down edge, a down-right ramp edge parallel to the up-down axis, a down-left ramp edge parallel to the up-down axis, and a down-perimeter edge. The cardinal-left planar facet is bordered by the left edge, a left-down ramp edge parallel to the left-right axis, a left-up ramp edge parallel to the left-right axis, and a left-perimeter edge. In one example implementation that optionally may be combined with any of the features described herein, the up-perimeter edge is higher than the up edge, the right-perimeter edge is higher than the right edge, the down-perimeter edge is higher than the down edge, and the left-perimeter edge is higher than the left edge. In one example implementation that optionally may be combined with any of the features described herein, the finger interface includes a diagonal up-right planar facet bordered by the up-right ramp edge, the right-up ramp edge, and an up-right perimeter edge, a diagonal down-right planar facet bordered by the right-down ramp edge, the down-right ramp edge, and a down-right perimeter edge, a diagonal down-left planar facet bordered by the down-left ramp edge, the left-down ramp edge, and a down-left perimeter edge, and a diagonal up-left planar facet bordered by the left-up ramp edge, the up-left ramp edge, and an up-left perimeter edge.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:
1. A removable finger pad for a game controller, the removable finger pad comprising:
 a first side including a finger interface, the finger interface including:
  a rectangular center planar facet having an up edge parallel to a left-right axis, a right edge parallel to an up-down axis, a down edge parallel to the left-right axis, and a left edge parallel to the up-down axis;
  a cardinal-up planar facet sharing the up edge with the rectangular center planar facet and extending at a ramp angle from the rectangular center planar facet;
  a cardinal-right planar facet sharing the right edge with the rectangular center planar facet and extending at the ramp angle from the rectangular center planar facet;
  a cardinal-down planar facet sharing the down edge with the rectangular center planar facet and extending at the ramp angle from the rectangular center planar facet; and
  a cardinal-left planar facet sharing the left edge with the rectangular center planar facet and extending at the ramp angle from the rectangular center planar facet; and
 a second side opposite the first side, the second side including a mounting interface configured to mate with a mounting platform of the game controller to removably affix the removable finger pad to the mounting platform.
2. The removable finger pad of claim 1, wherein the cardinal-up planar facet is bordered by the up edge, an up-left ramp edge parallel to the up-down axis, an up-right ramp edge parallel to the up-down axis, and an up-perimeter edge;
- wherein the cardinal-right planar facet is bordered by the right edge, a right-up ramp edge parallel to the left-right axis, a right-down ramp edge parallel to the left-right axis, and a right-perimeter edge;
- wherein the cardinal-down planar facet is bordered by the down edge, a down-right ramp edge parallel to the up-down axis, a down-left ramp edge parallel to the up-down axis, and a down-perimeter edge; and
- wherein the cardinal-left planar facet is bordered by the left edge, a left-down ramp edge parallel to the left-right axis, a left-up ramp edge parallel to the left-right axis, and a left-perimeter edge.

3. The removable finger pad of claim 2, wherein the up-left ramp edge, the up-right ramp edge, the right-up ramp edge, the right-down ramp edge, the down-right ramp edge, the down-left ramp edge, the left-down ramp edge, and the left-up ramp edge are perimeter edges.

4. The removable finger pad of claim 2, wherein the up-left ramp edge, the up-right ramp edge, the down-right ramp edge, and the down-left ramp edge are parallel with the up-down axis, and wherein the right-up ramp edge, the right-down ramp edge, the left-down ramp edge, and the left-up ramp edge are parallel with the left-right axis.

5. The removable finger pad of claim 2, wherein the up-left ramp edge, the up-right ramp edge, the right-up ramp edge, the right-down ramp edge, the down-right ramp edge, the down-left ramp edge, the left-down ramp edge, and the left-up ramp edge have a same ramp angle.

6. The removable finger pad of claim 2, wherein the up-perimeter edge is higher than the up edge, wherein the right-perimeter edge is higher than the right edge, wherein the down-perimeter edge is higher than the down edge, and wherein the left-perimeter edge is higher than the left edge.

7. The removable finger pad of claim 2, wherein the finger interface includes:
- a diagonal up-right planar facet bordered by the up-right ramp edge, the right-up ramp edge, and an up-right perimeter edge,
- a diagonal down-right planar facet bordered by the right-down ramp edge, the down-right ramp edge, and a down-right perimeter edge,
- a diagonal down-left planar facet bordered by the down-left ramp edge, the left-down ramp edge, and a down-left perimeter edge, and
- a diagonal up-left planar facet bordered by the left-up ramp edge, the up-left ramp edge, and an up-left perimeter edge.

8. The removable finger pad of claim 7, wherein the up-right perimeter edge, the down-right perimeter edge, the down-left perimeter edge, and the up-left perimeter edge are straight.

9. The removable finger pad of claim 7, wherein the up-right perimeter edge, the down-right perimeter edge, the down-left perimeter edge, and the up-left perimeter edge are rounded.

10. A removable finger pad for a game controller, the removable finger pad comprising:
- a first side including a finger interface, the finger interface including a rectangular center planar facet and a plurality of peripheral planar facets around the rectangular center planar facet, the center planar facet and the plurality of peripheral planar facets collectively sized and shaped for manual manipulation by a finger; and
- a second side opposite the first side, the second side including a mounting interface configured to mate with a mounting platform of the game controller to removably affix the removable finger pad to the mounting platform.

11. The removable finger pad of claim 10, wherein the plurality of peripheral planar facets include four cardinal planar facets, each cardinal planar facet neighboring the rectangular center planar facet.

12. The removable finger pad of claim 11, wherein each cardinal planar facet includes an inner edge and a perimeter edge positioned higher than the inner edge, such that each cardinal planar facet ramps upward from the rectangular center planar facet.

13. The removable finger pad of claim 12, wherein the perimeter edge of each cardinal planar facet is rounded.

14. The removable finger pad of claim 12, wherein the perimeter edge of each cardinal planar facet is straight.

15. The removable finger pad of claim 12, wherein the plurality of peripheral planar facets include four diagonal planar facets, each diagonal planar facet neighboring the rectangular center planar facet, and wherein each diagonal planar facet is positioned between a different pair of cardinal planar facets of the four cardinal planar facets.

16. The removable finger pad of claim 15, wherein each diagonal planar facet includes an inner corner and a perimeter edge positioned higher than the inner corner such that each diagonal planar facet ramps upward from the rectangular center planar facet.

17. A game controller comprising:
- a finger pad having a finger interface including:
  - a rectangular center planar facet having an up edge parallel to a left-right axis, a right edge parallel to an up-down axis, a down edge parallel to the left-right axis, and a left edge parallel to the up-down axis;
  - a cardinal-up planar facet sharing the up edge with the rectangular center planar facet and extending at a ramp angle from the rectangular center planar facet;
  - a cardinal-right planar facet sharing the right edge with the rectangular center planar facet and extending at the ramp angle from the rectangular center planar facet;
  - a cardinal-down planar facet sharing the down edge with the rectangular center planar facet and extending at the ramp angle from the rectangular center planar facet; and
  - a cardinal-left planar facet sharing the left edge with the rectangular center planar facet and extending at the ramp angle from the rectangular center planar facet.

18. The game controller of claim 17, wherein the cardinal-up planar facet is bordered by the up edge, an up-left ramp edge parallel to the up-down axis, an up-right ramp edge parallel to the up-down axis, and an up-perimeter edge;
- wherein the cardinal-right planar facet is bordered by the right edge, a right-up ramp edge parallel to the left-right axis, a right-down ramp edge parallel to the left-right axis, and a right-perimeter edge;
- wherein the cardinal-down planar facet is bordered by the down edge, a down-right ramp edge parallel to the up-down axis, a down-left ramp edge parallel to the up-down axis, and a down-perimeter edge; and
- wherein the cardinal-left planar facet is bordered by the left edge, a left-down ramp edge parallel to the left-right axis, a left-up ramp edge parallel to the left-right axis, and a left-perimeter edge.

19. The game controller of claim 18, wherein the up-perimeter edge is higher than the up edge, wherein the right-perimeter edge is higher than the right edge, wherein the down-perimeter edge is higher than the down edge, and wherein the left-perimeter edge is higher than the left edge.

20. The game controller of claim 18, wherein the finger interface includes:
- a diagonal up-right planar facet bordered by the up-right ramp edge, the right-up ramp edge, and an up-right perimeter edge,
- a diagonal down-right planar facet bordered by the right-down ramp edge, the down-right ramp edge, and a down-right perimeter edge,
- a diagonal down-left planar facet bordered by the down-left ramp edge, the left-down ramp edge, and a down-left perimeter edge, and
- a diagonal up-left planar facet bordered by the left-up ramp edge, the up-left ramp edge, and an up-left perimeter edge.

* * * * *